(12) United States Patent
Santhanam et al.

(10) Patent No.: US 11,917,461 B2
(45) Date of Patent: Feb. 27, 2024

(54) TECHNIQUES FOR MEASUREMENT REPORTING AND TRANSMIT POWER ALLOCATION IN POWER-CONSTRAINED ENVIRONMENT

(71) Applicant: QUALCOMM Incorporated, San Diego, CA (US)

(72) Inventors: Arvind Vardarajan Santhanam, San Diego, CA (US); Raghu Narayan Challa, San Diego, CA (US); Brian Clarke Banister, San Diego, CA (US); Troy Curtiss, Boulder, CO (US); Bhupesh Manoharlal Umatt, Poway, CA (US); Ramesh Chandra Chirala, San Diego, CA (US); Lin Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/451,767

(22) Filed: Oct. 21, 2021

(65) Prior Publication Data

US 2022/0132377 A1 Apr. 28, 2022

Related U.S. Application Data

(60) Provisional application No. 63/198,488, filed on Oct. 22, 2020.

(51) Int. Cl.
*H04W 36/00* (2009.01)
*H04W 52/34* (2009.01)

(52) U.S. Cl.
CPC ... *H04W 36/0058* (2018.08); *H04W 36/0069* (2018.08); *H04W 36/00837* (2018.08); *H04W 52/34* (2013.01)

(58) Field of Classification Search
CPC ......... H04W 36/0058; H04W 36/0069; H04W 36/00837; H04W 52/30; H04W 52/34;
(Continued)

(56) References Cited

U.S. PATENT DOCUMENTS

2009/0197632 A1* 8/2009 Ghosh .................. H04W 52/34
455/522
2016/0353440 A1 12/2016 Lee et al.
(Continued)

FOREIGN PATENT DOCUMENTS

EP 2880925 B1 7/2019
EP 3720240 A1 10/2020
(Continued)

OTHER PUBLICATIONS

International Search Report and Written Opinion—PCT/US2021/071996—ISA/EPO—dated Apr. 19, 2022.
(Continued)

*Primary Examiner* — Robert C Scheibel
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify, while camped on a first cell associated with a first radio access technology (RAT), a power management level for a communication using a second RAT, wherein the power management level indicates an available power for the communication using the second RAT, and wherein the available power is based at least in part on an exposure rate or an absorption rate. The UE may delay a transmission of a measurement report on the first cell based at least in part on the identification of the power management level. Numerous other aspects are provided.

30 Claims, 10 Drawing Sheets

(58) Field of Classification Search
CPC ............. H04W 52/346; H04W 52/365; H04W 52/146; H04W 52/38; H04W 52/367; H04W 52/228; H04W 52/285
See application file for complete search history.

(56) References Cited

U.S. PATENT DOCUMENTS

| | | |
|---|---|---|
| 2017/0318536 A1 | 11/2017 | Manepalli et al. |
| 2020/0305091 A1 | 9/2020 | Lee et al. |
| 2021/0037482 A1* | 2/2021 | Shin .................... H04W 52/365 |
| 2021/0051601 A1* | 2/2021 | Cha ..................... H04W 52/367 |
| 2021/0195439 A1* | 6/2021 | Prabhakar ............. H04W 24/02 |
| 2021/0282094 A1 | 9/2021 | Loehr et al. |
| 2022/0303975 A1* | 9/2022 | Ma ..................... H04W 72/0453 |
| 2022/0377681 A1* | 11/2022 | Comsa ................... H04B 17/24 |

FOREIGN PATENT DOCUMENTS

| | | |
|---|---|---|
| EP | 3780400 A1 | 2/2021 |
| WO | WO-2020010232 A1 | 1/2020 |
| WO | 2020239445 A1 | 12/2020 |

OTHER PUBLICATIONS

Partial International Search Report—PCT/US2021/071996—ISA/EPO—dated Feb. 24, 2022.

* cited by examiner

TECHNIQUES FOR MEASUREMENT REPORTING AND TRANSMIT POWER ALLOCATION IN POWER-CONSTRAINED ENVIRONMENT

CROSS-REFERENCE TO RELATED APPLICATION

This Patent Application claims priority to U.S. Provisional Patent Application No. 63/198,488, filed on Oct. 22, 2020, entitled "TECHNIQUES FOR MEASUREMENT REPORTING AND TRANSMIT POWER ALLOCATION IN POWER-CONSTRAINED ENVIRONMENT," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for measurement reporting and transmit power allocation in a power-constrained environment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful. For example, further improvements in power management remain useful.

SUMMARY

In some aspects, a method of wireless communication performed by a user equipment (UE) includes identifying, while camped on a first cell associated with a first radio access technology (RAT), a power management level for a communication using a second RAT, wherein the power management level indicates an available power for the communication using the second RAT, and wherein the available power is based at least in part on an exposure rate or an absorption rate; and delaying a transmission of a measurement report on the first cell based at least in part on the identification of the power management level.

In some aspects, the power management level fails to satisfy a threshold, and the transmission is delayed based at least in part on the power management level failing to satisfy the threshold.

In some aspects, the threshold is associated with a communication type of the communication using the second RAT.

In some aspects, the threshold is associated with maintaining a minimum target data rate associated with the second RAT.

In some aspects, the communication using the second RAT is a random access channel (RACH) communication.

In some aspects, the communication using the second RAT is associated with an uplink shared channel or an uplink control channel.

In some aspects, the available power is a residual available power after power has been allocated for a communication using the first RAT.

In some aspects, the method includes determining that a threshold associated with the power management level is satisfied; and resuming transmission of the measurement report based at least in part on the threshold being satisfied.

In some aspects, the method includes determining that the measurement report is associated with a particular frequency, wherein the power management level is based at least in part on the measurement report being associated with the particular frequency.

In some aspects, the identification of the power management level is based at least in part on whether the particular frequency associated with the measurement report is associated with a dual-connectivity cell addition or a handover or redirection to a standalone cell.

In some aspects, the method includes determining whether the particular frequency is associated with the dual-connectivity cell addition or the handover or redirection to the standalone cell based at least in part on the particular frequency being a millimeter wave frequency and the UE not supporting a millimeter wave primary cell.

In some aspects, the method includes determining whether the particular frequency is associated with the dual-connectivity cell addition or the handover or redirection to the standalone cell based at least in part on the particular frequency being in a frequency range that the UE does not support for a primary cell.

In some aspects, the method includes determining whether the particular frequency is associated with the dual-connectivity cell addition or the handover or redirection to the standalone cell based at least in part on whether the measurement report is associated with a location where a standalone mode associated with the second RAT is not deployed.

In some aspects, the method includes determining whether the particular frequency is associated with the dual-connectivity cell addition or the handover or redirection to the standalone cell based at least in part on whether the UE has received information indicating that the particular frequency can be used for a standalone cell or a secondary cell group.

In some aspects, the transmission of the measurement report is delayed with regard to a frequency for which the power management level is identified.

In some aspects, measurement reporting is not delayed with regard to a frequency for which the power management level is not identified.

In some aspects, the method includes rejecting a blind secondary cell group addition associated with a cell based at least in part on the power management level being identified for the cell.

In some aspects, the power management level is associated with a handover of the UE to the second RAT, and the measurement report is associated with a measurement configured on a frequency associated with the second RAT.

In some aspects, the power management level is based at least in part on historical information associated with a cell.

In some aspects, the power management level is based at least in part on motion information determined by the UE.

In some aspects, the first RAT is a Long Term Evolution RAT.

In some aspects, the first RAT is a New Radio RAT in a Frequency Range 1.

In some aspects, the first RAT is a New Radio RAT in a Frequency Range 2.

In some aspects, the second RAT is a Long Term Evolution RAT.

In some aspects, the second RAT is a New Radio RAT in a Frequency Range 1.

In some aspects, the second RAT is a New Radio RAT in a Frequency Range 2.

In some aspects, the method includes transmitting information indicating whether the UE supports the second RAT.

In some aspects, the information indicating whether the UE supports the second RAT is transmitted as a fail reason in a message rejecting a blind secondary cell group addition associated with a cell.

In some aspects, a method of wireless communication performed by a UE includes identifying, while connected to a first cell associated with a first RAT, a second cell, associated with a second RAT, for dual-connectivity communication or a handover; identifying a power management level for the second cell, wherein the power management level is based at least in part on a compliance power budget of the UE; and allocating a power for the second cell based at least in part on the identified power management level.

In some aspects, the power management level is based at least in part on a determination that decreasing power allocated for the first RAT will not cause radio link failure on the first cell.

In some aspects, the power management level is based at least in part on a determination that a measurement on the second cell is within a threshold of a measurement reporting criterion, or that the measurement on the second cell satisfies the measurement reporting criterion and a time to trigger the handover or a cell addition has started.

In some aspects, the power management level is based at least in part on a determination, before the compliance power budget is modified, that the second cell would not have adequate power to complete a communication.

In some aspects, the power management level is based at least in part on a determination regarding a throughput or energy efficiency if the second cell is added.

In some aspects, allocation of the power for the second cell further comprises configuring an antenna module associated with the first RAT to decrease power allocated for the first RAT.

In some aspects, the method includes throttling an uplink transmission on the first RAT based at least in part on the identification of the power management level.

In some aspects, the second cell is to be added as a primary secondary cell of the dual-connectivity communication.

In some aspects, a UE for wireless communication includes a memory; and one or more processors coupled to the memory, the memory and the one or more processors configured to: identify, while camped on a first cell associated with a first RAT, a power management level for a communication using a second RAT, wherein the power management level indicates an available power for the communication using the second RAT, and wherein the available power is based at least in part on an exposure rate or an absorption rate; and delay a transmission of a measurement report on the first cell based at least in part on the identification of the power management level.

In some aspects, the power management level fails to satisfy a threshold, and the transmission is delayed based at least in part on the power management level failing to satisfy the threshold.

In some aspects, the threshold is associated with a communication type of the communication using the second RAT.

In some aspects, the threshold is associated with maintaining a minimum target data rate associated with the second RAT.

In some aspects, the communication using the second RAT is a RACH communication.

In some aspects, the communication using the second RAT is associated with an uplink shared channel or an uplink control channel.

In some aspects, the available power is a residual available power after power has been allocated for a communication using the first RAT.

In some aspects, the one or more processors are further configured to: determine that a threshold associated with the power management level is satisfied; and resume transmission of the measurement report based at least in part on the threshold being satisfied.

In some aspects, the one or more processors are further configured to determine that the measurement report is associated with a particular frequency, wherein the power management level is based at least in part on the measurement report being associated with the particular frequency.

In some aspects, the identification of the power management level is based at least in part on whether the particular frequency associated with the measurement report is associated with a dual-connectivity cell addition or a handover or redirection to a standalone cell.

In some aspects, the one or more processors are further configured to determine whether the particular frequency is associated with the dual-connectivity cell addition or the handover or redirection to the standalone cell based at least in part on the particular frequency being a millimeter wave frequency and the UE not supporting a millimeter wave primary cell.

In some aspects, the one or more processors are further configured to determine whether the particular frequency is associated with the dual-connectivity cell addition or the handover or redirection to the standalone cell based at least in part on the particular frequency being in a frequency range that the UE does not support for a primary cell.

In some aspects, the one or more processors are further configured to determine whether the particular frequency is associated with the dual-connectivity cell addition or the handover or redirection to the standalone cell based at least in part on whether the measurement report is associated with a location where a standalone mode associated with the second RAT is not deployed.

In some aspects, the one or more processors are further configured to determine whether the particular frequency is associated with the dual-connectivity cell addition or the handover or redirection to the standalone cell based at least in part on whether the UE has received information indicating that the particular frequency can be used for a standalone cell or a secondary cell group.

In some aspects, the transmission of the measurement report is delayed with regard to a frequency for which the power management level is identified.

In some aspects, measurement reporting is not delayed with regard to a frequency for which the power management level is not identified.

In some aspects, the one or more processors are further configured to reject a blind secondary cell group addition associated with a cell based at least in part on the power management level being identified for the cell.

In some aspects, the power management level is associated with a handover of the UE to the second RAT, and the measurement report is associated with a measurement configured on a frequency associated with the second RAT.

In some aspects, the power management level is based at least in part on historical information associated with a cell.

In some aspects, the power management level is based at least in part on motion information determined by the UE.

In some aspects, the first RAT is a Long Term Evolution RAT.

In some aspects, the first RAT is a New Radio RAT in a Frequency Range 1.

In some aspects, the first RAT is a New Radio RAT in a Frequency Range 2.

In some aspects, the second RAT is a Long Term Evolution RAT.

In some aspects, the second RAT is a New Radio RAT in a Frequency Range 1.

In some aspects, the second RAT is a New Radio RAT in a Frequency Range 2.

In some aspects, the one or more processors are further configured to transmit information indicating whether the UE supports the second RAT.

In some aspects, the information indicating whether the UE supports the second RAT is transmitted as a fail reason in a message rejecting a blind secondary cell group addition associated with a cell.

In some aspects, a UE for wireless communication includes a memory and one or more processors coupled to the memory, the memory and the one or more processors configured to: identify, while connected to a first cell associated with a first RAT, a second cell, associated with a second RAT, for dual-connectivity communication or a handover; identify a power management level for the second cell, wherein the power management level is based at least in part on a compliance power budget of the UE; and allocate a power for the second cell based at least in part on the identified power management level.

In some aspects, the power management level is based at least in part on a determination that decreasing power allocated for the first RAT will not cause radio link failure on the first cell.

In some aspects, the power management level is based at least in part on a determination that a measurement on the second cell is within a threshold of a measurement reporting criterion, or that the measurement on the second cell satisfies the measurement reporting criterion and a time to trigger the handover or a cell addition has started.

In some aspects, the power management level is based at least in part on a determination, before the compliance power budget is modified, that the second cell would not have adequate power to complete a communication.

In some aspects, the power management level is based at least in part on a determination regarding a throughput or energy efficiency if the second cell is added.

In some aspects, the one or more processors, when allocating the power for the second cell, are configured to configure an antenna module associated with the first RAT to decrease power allocated for the first RAT.

In some aspects, the one or more processors are further configured to throttle an uplink transmission on the first RAT based at least in part on the identification of the power management level.

In some aspects, the second cell is to be added as a primary secondary cell of the dual-connectivity communication.

In some aspects, a non-transitory computer-readable medium storing a set of instructions for wireless communication includes one or more instructions that, when executed by one or more processors of a UE, cause the UE to: identify, while camped on a first cell associated with a first RAT, a power management level for a communication using a second RAT, wherein the power management level indicates an available power for the communication using the second RAT, and wherein the available power is based at least in part on an exposure rate or an absorption rate; and delay a transmission of a measurement report on the first cell based at least in part on the identification of the power management level.

In some aspects, the power management level fails to satisfy a threshold, and the transmission is delayed based at least in part on the power management level failing to satisfy the threshold.

In some aspects, the threshold is associated with a communication type of the communication using the second RAT.

In some aspects, the threshold is associated with maintaining a minimum target data rate associated with the second RAT.

In some aspects, the communication using the second RAT is a RACH communication.

In some aspects, the communication using the second RAT is associated with an uplink shared channel or an uplink control channel.

In some aspects, the available power is a residual available power after power has been allocated for a communication using the first RAT.

In some aspects, the one or more instructions further cause the UE to determine that a threshold associated with the power management level is satisfied; and resume transmission of the measurement report based at least in part on the threshold being satisfied.

In some aspects, the one or more instructions further cause the UE to: determine that the measurement report is associated with a particular frequency, wherein the power management level is based at least in part on the measurement report being associated with the particular frequency.

In some aspects, the identification of the power management level is based at least in part on whether the particular frequency associated with the measurement report is associated with a dual-connectivity cell addition or a handover or redirection to a standalone cell.

In some aspects, the one or more instructions further cause the UE to determine whether the particular frequency is associated with the dual-connectivity cell addition or the handover or redirection to the standalone cell based at least in part on the particular frequency being a millimeter wave frequency and the UE not supporting a millimeter wave primary cell.

In some aspects, the one or more instructions further cause the UE to determine whether the particular frequency is associated with the dual-connectivity cell addition or the handover or redirection to the standalone cell based at least in part on the particular frequency being in a frequency range that the UE does not support for a primary cell.

In some aspects, the one or more instructions further cause the UE to determine whether the particular frequency is associated with the dual-connectivity cell addition or the handover or redirection to the standalone cell based at least in part on whether the measurement report is associated with a location where a standalone mode associated with the second RAT is not deployed.

In some aspects, the one or more instructions further cause the UE to determine whether the particular frequency is associated with the dual-connectivity cell addition or the handover or redirection to the standalone cell based at least in part on whether the UE has received information indicating that the particular frequency can be used for a standalone cell or a secondary cell group.

In some aspects, the transmission of the measurement report is delayed with regard to a frequency for which the power management level is identified.

In some aspects, measurement reporting is not delayed with regard to a frequency for which the power management level is not identified.

In some aspects, the one or more instructions further cause the UE to reject a blind secondary cell group addition associated with a cell based at least in part on the power management level being identified for the cell.

In some aspects, the power management level is associated with a handover of the UE to the second RAT, and the measurement report is associated with a measurement configured on a frequency associated with the second RAT.

In some aspects, the power management level is based at least in part on historical information associated with a cell.

In some aspects, the power management level is based at least in part on motion information determined by the UE.

In some aspects, the first RAT is a Long Term Evolution RAT.

In some aspects, the first RAT is a New Radio RAT in a Frequency Range 1.

In some aspects, the first RAT is a New Radio RAT in a Frequency Range 2.

In some aspects, the second RAT is a Long Term Evolution RAT.

In some aspects, the second RAT is a New Radio RAT in a Frequency Range 1.

In some aspects, the second RAT is a New Radio RAT in a Frequency Range 2.

In some aspects, the one or more instructions further cause the UE to transmit information indicating whether the UE supports the second RAT.

In some aspects, the information indicating whether the UE supports the second RAT is transmitted as a fail reason in a message rejecting a blind secondary cell group addition associated with a cell.

In some aspects, a non-transitory computer-readable medium storing a set of instructions for wireless communication includes one or more instructions that, when executed by one or more processors of a UE, cause the UE to: identify, while connected to a first cell associated with a first RAT, a second cell, associated with a second RAT, for dual-connectivity communication or a handover; identify a power management level for the second cell, wherein the power management level is based at least in part on a compliance power budget of the UE; and allocate a power for the second cell based at least in part on the identified power management level.

In some aspects, the power management level is based at least in part on a determination that decreasing power allocated for the first RAT will not cause radio link failure on the first cell.

In some aspects, the power management level is based at least in part on a determination that a measurement on the second cell is within a threshold of a measurement reporting criterion, or that the measurement on the second cell satisfies the measurement reporting criterion and a time to trigger the handover or a cell addition has started.

In some aspects, the power management level is based at least in part on a determination, before the compliance power budget is modified, that the second cell would not have adequate power to complete a communication.

In some aspects, the power management level is based at least in part on a determination regarding a throughput or energy efficiency if the second cell is added.

In some aspects, the one or more instructions, that cause the UE to allocate the power for the second cell, cause the UE to configure an antenna module associated with the first RAT to decrease power allocated for the first RAT.

In some aspects, the one or more instructions further cause the UE to throttle an uplink transmission on the first RAT based at least in part on the identification of the power management level.

In some aspects, the second cell is to be added as a primary secondary cell of the dual-connectivity communication.

In some aspects, an apparatus for wireless communication includes means for identifying, while camped on a first cell associated with a first RAT, a power management level for a communication using a second RAT, wherein the power management level indicates an available power for the communication using the second RAT, and wherein the available power is based at least in part on an exposure rate or an absorption rate; and means for delaying a transmission of a measurement report on the first cell based at least in part on the identification of the power management level.

In some aspects, the power management level fails to satisfy a threshold, and the transmission is delayed based at least in part on the power management level failing to satisfy the threshold.

In some aspects, the threshold is associated with a communication type of the communication using the second RAT.

In some aspects, the threshold is associated with maintaining a minimum target data rate associated with the second RAT.

In some aspects, the communication using the second RAT is a RACH communication.

In some aspects, the communication using the second RAT is associated with an uplink shared channel or an uplink control channel.

In some aspects, the available power is a residual available power after power has been allocated for a communication using the first RAT.

In some aspects, the apparatus includes means for determining that a threshold associated with the power management level is satisfied; and means for resuming transmission of the measurement report based at least in part on the threshold being satisfied.

In some aspects, the apparatus includes means for determining that the measurement report is associated with a particular frequency, wherein the power management level is based at least in part on the measurement report being associated with the particular frequency.

In some aspects, the identification of the power management level is based at least in part on whether the particular frequency associated with the measurement report is associated with a dual-connectivity cell addition or a handover or redirection to a standalone cell.

In some aspects, the apparatus includes means for determining whether the particular frequency is associated with the dual-connectivity cell addition or the handover or redirection to the standalone cell based at least in part on the particular frequency being a millimeter wave frequency and the apparatus not supporting a millimeter wave primary cell.

In some aspects, the apparatus includes means for determining whether the particular frequency is associated with the dual-connectivity cell addition or the handover or redirection to the standalone cell based at least in part on the particular frequency being in a frequency range that the apparatus does not support for a primary cell.

In some aspects, the apparatus includes means for determining whether the particular frequency is associated with the dual-connectivity cell addition or the handover or redirection to the standalone cell based at least in part on whether the measurement report is associated with a location where a standalone mode associated with the second RAT is not deployed.

In some aspects, the apparatus includes means for determining whether the particular frequency is associated with the dual-connectivity cell addition or the handover or redirection to the standalone cell based at least in part on whether the apparatus has received information indicating that the particular frequency can be used for a standalone cell or a secondary cell group.

In some aspects, the transmission of the measurement report is delayed with regard to a frequency for which the power management level is identified.

In some aspects, measurement reporting is not delayed with regard to a frequency for which the power management level is not identified.

In some aspects, the apparatus includes means for rejecting a blind secondary cell group addition associated with a cell based at least in part on the power management level being identified for the cell.

In some aspects, the power management level is associated with a handover of the apparatus to the second RAT, and the measurement report is associated with a measurement configured on a frequency associated with the second RAT.

In some aspects, the power management level is based at least in part on historical information associated with a cell.

In some aspects, the power management level is based at least in part on motion information determined by the apparatus.

In some aspects, the first RAT is a Long Term Evolution RAT.

In some aspects, the first RAT is a New Radio RAT in a Frequency Range 1.

In some aspects, the first RAT is a New Radio RAT in a Frequency Range 2.

In some aspects, the second RAT is a Long Term Evolution RAT.

In some aspects, the second RAT is a New Radio RAT in a Frequency Range 1.

In some aspects, the second RAT is a New Radio RAT in a Frequency Range 2.

In some aspects, the apparatus includes means for transmitting information indicating whether the apparatus supports the second RAT.

In some aspects, the information indicating whether the apparatus supports the second RAT is transmitted as a fail reason in a message rejecting a blind secondary cell group addition associated with a cell.

In some aspects, an apparatus for wireless communication includes means for identifying, while connected to a first cell associated with a first RAT, a second cell, associated with a second RAT, for dual-connectivity communication or a handover; means for identifying a power management level for the second cell, wherein the power management level is based at least in part on a compliance power budget of the apparatus; and means for allocating a power for the second cell based at least in part on the identified power management level.

In some aspects, the power management level is based at least in part on a determination that decreasing power allocated for the first RAT will not cause radio link failure on the first cell.

In some aspects, the power management level is based at least in part on a determination that a measurement on the second cell is within a threshold of a measurement reporting criterion, or that the measurement on the second cell satisfies the measurement reporting criterion and a time to trigger the handover or a cell addition has started.

In some aspects, the power management level is based at least in part on a determination, before the compliance power budget is modified, that the second cell would not have adequate power to complete a communication.

In some aspects, the power management level is based at least in part on a determination regarding a throughput or energy efficiency if the second cell is added.

In some aspects, the means for allocation of the power for the second cell further comprises means for configuring an antenna module associated with the first RAT to decrease power allocated for the first RAT.

In some aspects, the apparatus includes means for throttling an uplink transmission on the first RAT based at least in part on the identification of the power management level.

In some aspects, the second cell is to be added as a primary secondary cell of the dual-connectivity communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
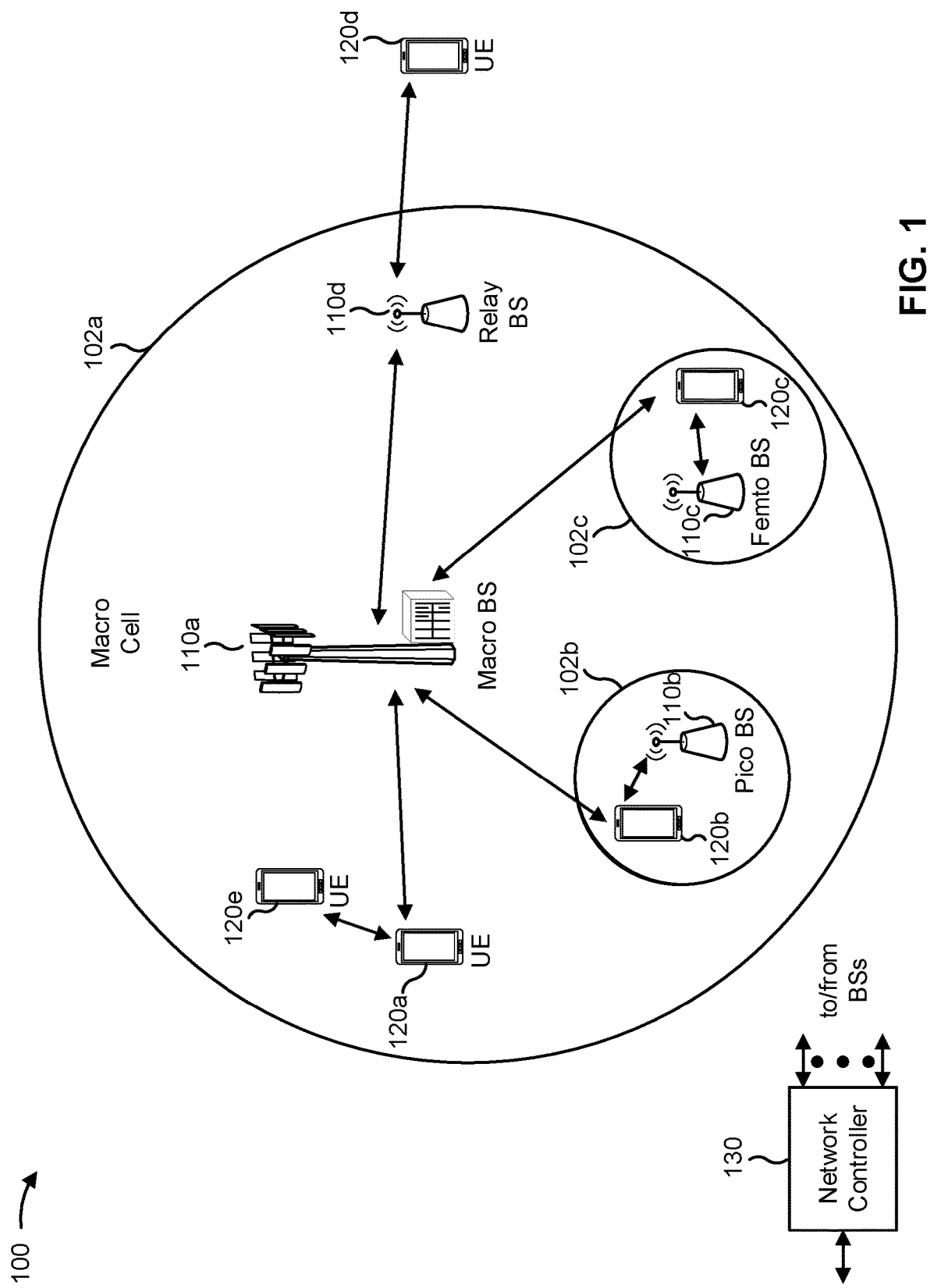
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
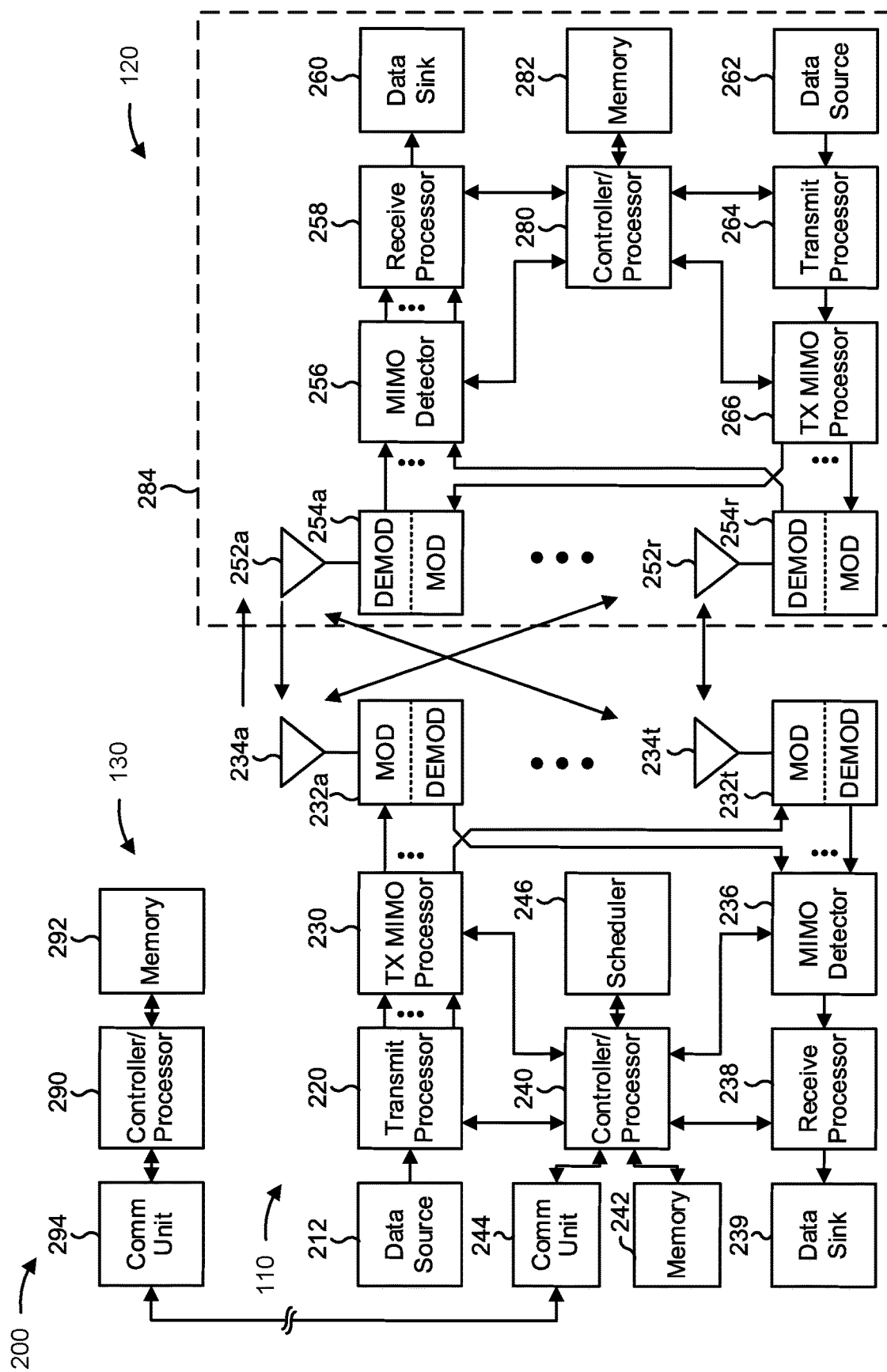
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with measurement reporting and transmit power allocation in a power-constrained environment, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions.

In some aspects, the UE includes means for identifying, while camped on a first cell associated with a first RAT, a power management level for a communication using a second RAT, wherein the power management level indicates an available power for the communication using the second RAT, and wherein the available power is based at least in part on an exposure rate or an absorption rate; and/or means for delaying a transmission of a measurement report on the first cell based at least in part on the identification of the power management level. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for identifying, while connected to a first cell associated with a first RAT, a second cell, associated with a second RAT, for dual-connectivity communication or a handover; means for identifying a power management level for the second cell, wherein the power management level is based at least in part on a compliance power budget of the UE; and/or means for allocating a power for the second cell based at least in part on the identified power management level. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

As indicated above, FIG. 2 is provided as an example. Other examples may differ from what is described with regard to FIG. 2.

A wireless communication device, such as a UE, may be subject to certain limitations on transmit power of the wireless communication device. For example, a regulatory body may impose limits on exposure rate of a user of a UE, absorption rate of a user of the UE, or the like, so that the user is not subjected to untenable amounts of radiated power from the UE. One example of a limit is defined by a specific absorption rate (SAR). SAR is a measurement of the rate (e.g., amount per unit mass) at which radio frequency (RF) electromagnetic field energy is absorbed by the human body. The Federal Communications Commission (FCC) and other regulatory entities have placed limitations on SAR, with which UEs subject to these limitations must comply. Examples of such limitations include 1.6 milliwatts per gram (mW/g) of human tissue (as specified by the FCC) and 2.0 mW/g per 10-grams of human tissue for the European Union (EU) and many other countries who follow the International Commission for Non-Ionizing Radiation Protection (ICNIRP). Another example of a limit is defined by a maximum permissible exposure (MPE). "MPE" refers to the highest power or power density (PD) (expressed in watts per square centimeter or joules per square centimeter) allowed for the radiation source (e.g., the UE) to be considered safe.

Some of these limitations may be associated with a particular frequency band or RAT. For example, a UE may operate on different frequency bands (e.g., millimeter wave bands, also referred to as Frequency Range 2; sub-6 gigahertz bands, also referred to as Frequency Range 1, or the like) and/or with different RATs (e.g., LTE, NR, millimeter wave, sub-6, or the like). The summation of concurrent transmission power across all bands and all technologies for the UE may be mandated to be SAR or MPE compliant. In particular, an equation of the following form may be satisfied by the UE. The following equation may provide for the UE to combine different exposure metrics, normalize the metrics with their respective limits, and add them together:

$$\sum_{i \in [100 kHz, 10 GHz]} \frac{SAR_i}{SAR_{limit}} + \sum_{i \in [10 GHz, 300 GHz]} \frac{PD_i}{PD_{limit}} \leq 1,$$

where $SAR_i$=the SAR exposure (in mW/g) measured from transmitter "i" in frequency range [100 kHz, 10 GHz], $SAR_{limit}$=the SAR limit (in mW/g) (regulatory requirement, fixed across bands), $PD_i$=the power density (in W/cm$^2$ or J/cm$^2$) from transmitter "i" in frequency range (10 GHz, 300 GHz], $PD_{limit}$=the power density limit (in W/cm$^2$ or J/cm$^2$). If the equation above is violated (i.e., if the determined sum is greater than 1), the UE may apply a backoff, based at least in part on arbitration rules defined herein, so that the UE is SAR/MPE compliant.

In some scenarios, a UE camped on a first RAT (e.g., a UE with a primary cell connection via a base station using the first RAT) and performing a communication via a second RAT, may allocate available power of the UE for communications using the first RAT and communications using the second RAT. Generally, the UE may prioritize the first RAT over the second RAT, since the UE is camped on the first RAT. For example, the UE may favor the first RAT by providing the first RAT with a full compliance power budget (e.g., a full power allocation) requested by the first RAT, and allocating any residual compliance power budget (e.g., any residual transmit power) to the second RAT. Generally, a compliance power budget may indicate a transmit power allocation over a future time horizon that each RAT used by a UE can utilize. However, in many scenarios, the residual compliance power budget may not be adequate for communications on the second RAT. For example, the residual compliance power budget may not provide sufficient transmit power for reliable random access channel (RACH) transmission in association with adding a cell to a secondary cell group (SCG), successful physical uplink control channel (PUCCH) transmission, or successful physical uplink shared channel (PUSCH) transmission. An unsuccessful RACH transmission, such as due to an insufficient transmit power associated with a residual compliance power budget, may lead to radio link failure (RLF) of the SCG, whereas an unsuccessful PDCCH/PDSCH transmission may lead to release of the SCG. Similar conditions can arise during handover (HO) between different RATs of a dual-connectivity communication. Thus, throughput is lowered. Furthermore, the above conditions can occur cyclically, leading to lower throughput over a long time period.

As a more particular example, a UE may be camped on an LTE cell in a radio resource control (RRC) connected state. A base station may configure the UE with one or more NR measurement objects (MOs). A measurement object indicates a measurement to be performed by a UE and conditions for transmitting a measurement report based at least in part on the measurement. Often, a base station may configure a UE with an NR MO to enable the UE to identify a suitable NR cell, such as for a dual-connectivity communication or a handover. More generally, MOs may be used to perform radio resource management (RRM) of the UE. The UE on the LTE RAT may be power-constrained due to SAR restrictions. The UE may perform NR measurements in accordance with the NR MO(s) and may transmit a measurement report associated with an NR cell based at least in part on an event B1 or event B2 (e.g., conditions indicating that the NR cell's measurement is greater than a threshold) to the base station. The base station may add the NR cell as a primary secondary cell (PSCell) (e.g., a primary cell of a secondary cell group) and may configure the UE in a dual-connectivity mode, such as an E-UTRA-NR dual connectivity (ENDC) mode. In the ENDC mode, the UE may favor LTE (e.g., the RAT of the UE's PCell or master cell group (MCG)) by giving LTE the full needed compliance power budget. Thus, the residual compliance power budget may be provided to NR. The compliance power budget may map to a transmit power allocation over a future time horizon that each technology (LTE, FR1, FR2, or the like) can use during this time horizon.

However, the residual power allocation may not be adequate for NR to either complete RACH successfully, or after a successful NR RACH, to successfully transmit PUCCH/PUSCH channels. The former can result in NR SCG RLF while the latter can result in the base station releasing the NR SCG. The above process results in lower throughput. Additionally, the above process can repeat itself cyclically resulting in lower throughput for a long time period. The same issue can occur during HOs between FR1 and FR2 of an ENDC call when a UE moves between coverages between FR1 and FR2, and the UE has restrictions from compliance power budgets on LTE/FR1 (e.g., SAR) and/or FR2 (e.g., MPE).

Some techniques and apparatuses described herein provide for a UE to determine, while camped on a first RAT, a power management level for a second RAT. For example, the power management level may indicate an available power for a communication on the second RAT. In some aspects, the power management level may be insufficient for the communication on the second RAT. The UE may delay a transmission of a measurement report on the second RAT based at least in part on the power management level (e.g., based at least in part on determining that the power management level is insufficient for the communication on the second RAT). In some aspects, the UE may identify a prospective addition of a cell associated with a second RAT (e.g., NR), and may adjust a power management level (e.g., a compliance power budget) for the cell associated with the second RAT in order to facilitate communication on the second RAT. Thus, the UE may improve throughput and reduce the occurrence of RLF and connection release.

Figure 3:
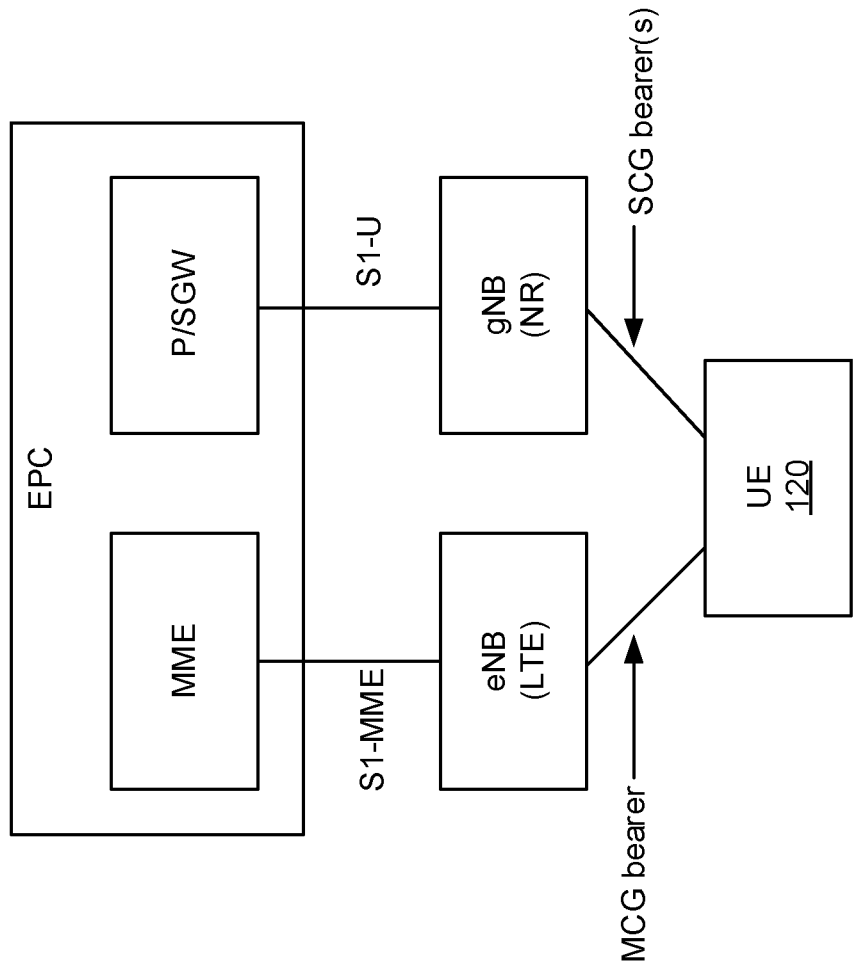
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT, such as an FR1 RAT and an FR2 RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
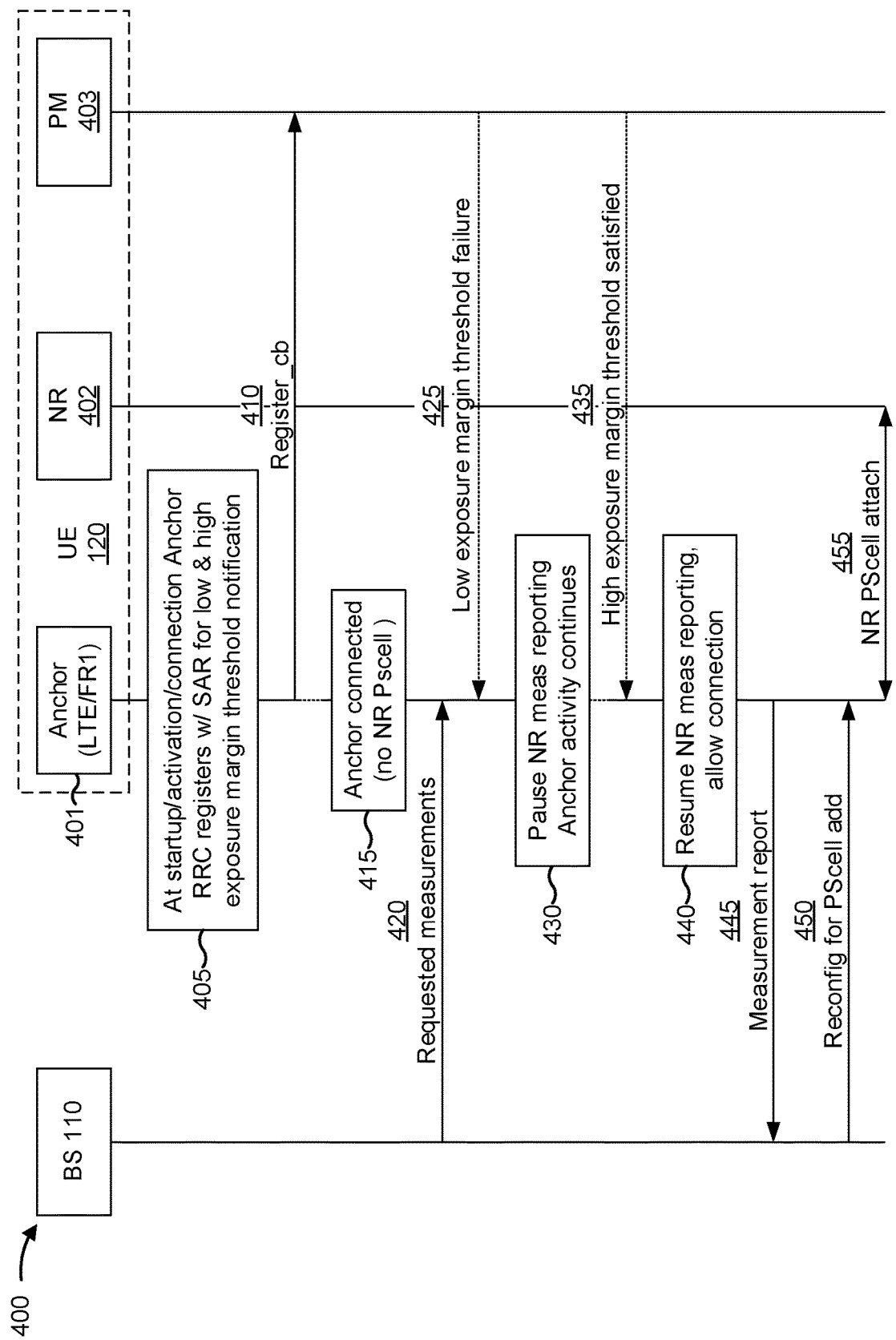
FIG. 4 is a diagram illustrating an example of signaling associated with delaying measurement reporting in a power-constrained scenario, in accordance with the present disclosure.

FIG. 4 is a diagram illustrating an example 400 of signaling associated with delaying measurement reporting in a power-constrained scenario, in accordance with the present disclosure. As shown, FIG. 4 includes a BS 110 and various modules of a UE 120. The modules include an anchor module, which is associated with an LTE RAT or an FR1 RAT, an NR module, which may be associated with an FR1 RAT or an FR2 RAT, and a power management (PM) module. In some aspects, the anchor module may be associated with a first protocol stack of the UE, and the NR module may be associated with a second protocol stack of the UE, such as for dual-connectivity communications or for a make-before-break handover. In some aspects, the anchor module and the NR module may be associated with a same protocol stack of the UE, such as for a handover from a first RAT associated with the anchor module to a second RAT associated with the NR module. Generally, the RAT associated with the anchor module is referred to herein as a first RAT and the RAT associated with the NR module is referred to herein as a second RAT. An action described herein as performed by the UE 120 can be performed by any of the anchor module, the NR module, or the power management module, unless specified otherwise. In some aspects, as described with regard to FIGS. 6 and 10, the UE 120 may include a measurement module, which may perform measurements based at least in part on configured measurement objects, such as described with regard to FIGS. 4-8.

As shown by reference number 405, the UE may determine a first threshold and a second threshold, shown as a low exposure margin threshold and a high exposure margin threshold. For example, as shown by reference number 410, the anchor module may register with the PM module to receive notifications regarding a first threshold and a second threshold, shown as a low exposure margin threshold and a high exposure margin threshold. In some aspects, the low exposure margin threshold may be a threshold for an available power for a communication using the second RAT. For example, the available power may be based at least in part on an exposure rate or an absorption rate, such as a SAR or an MPE. If an available power for the second RAT fails to satisfy the first threshold (for example, due to power of the UE 120 being prioritized for the anchor module or the first RAT), then the UE may determine that transmission of a measurement report on the first RAT is to be delayed, as described elsewhere herein. For example, the UE may identify a power management level for a communication using the second RAT, where the power management level indicates an available power (e.g., a residual available power) for the communication using the second RAT. If the power management level or the available power fails to satisfy the first threshold, then the UE 120 may delay transmission of the measurement report.

In some aspects, the power management level may be associated with a residual available power for the second RAT. For example, the power management level may indicate a residual available power for a dual-connectivity communication (e.g., from NR to ENDC) or for a handover (e.g., to an NR standalone (SA) mode). In some aspects, the first threshold may be based at least in part on whether residual available power of the UE 120 (e.g., after allocating power for the first RAT) is sufficient for at least one of a successful RACH operation on the second RAT, PUCCH or PUSCH link maintenance on the second RAT, maintaining a minimum target uplink data rate on the second RAT, or the like.

In some aspects, the UE 120 may determine the first threshold and/or the second threshold based at least in part on historical data. For example, the UE 120 may use statistics such as cell history data to refine an estimate of an appropriate uplink power for the first threshold and/or the second threshold. For instance, in a frequently dwelled cell location (e.g., home, work, etc.), the UE 120 can determine, based at least in part on a prior value determined under particular RF conditions on LTE and NR measurements, the appropriate value for a compliance power budget, and therefore the first threshold or the second threshold. In some aspects, the UE 120 may determine the first threshold and/or the second threshold based at least in part on motion input, such as information indicating whether the UE 120 is stationary or mobile, information from an inertial sensor of the UE 120, or the like.

As shown by reference number 415, the anchor module may connect to the BS 110. For example, the UE 120 may establish a connection with or camp on the BS 110 using the first RAT. The connection may be via a primary cell (PCell) associated with the first RAT, such as an LTE PCell.

As shown by reference number 420, the UE 120 (e.g., the anchor module) may receive, from the BS 110, information indicating one or more requested measurements. For example, the information indicating the one or more requested measurements may include one or more measurement objects. In some aspects, the one or more measurements objects may indicate a frequency associated with the second RAT. For example, the one or more measurement objects may indicate that the UE 120 is to perform a measurement on the second RAT, such as for the purpose of identifying a suitable cell associated with the second RAT for a dual-connectivity communication or identifying a suitable cell associated with the second RAT for a handover in a standalone mode.

A measurement object may be associated with a measurement frequency. In example 400, the measurement frequency may be associated with an NR cell, though the measurement frequency can be associated with any frequency associated with the second RAT. In some aspects, the measurement frequency can be configured for a prospective ENDC Addition (e.g., an FR2 measurement frequency, when the UE 120 does not support an FR2 SA mode). In some aspects, the measurement frequency can be configured for a prospective LTE to NR packet-switched (PS) handover or redirection. In the case of the handover or redirection, while the UE 120 switches from LTE to NR and there is only one RAT performing transmission at any given time, the UE 120 may still delay measurement event reporting (as described in more detail below), as the UE 120 may already have been compliance-budget-limited, and operation in an NR SA mode may require higher compliance power budget to provide acceptable link performance (e.g., such as in the case when NR has a higher pathloss than LTE).

In some aspects, the UE 120 may determine whether a measurement frequency, specified by an MO, is a frequency for ENDC only (and not NR SA). For example, the UE 120 may determine that the measurement frequency is for ENDC if the NR MO indicates a mmW frequency and the UE 120 does not support mmW as an NR PCell (which may be indicated in UE capability information). As another example, the UE 120 may determine that the measurement frequency is for ENDC if the NR MO indicates an FR1 frequency and the UE 120 does not an FR1 band associated with the FR1 frequency as an NR PCell (which may be indicated in UE capability information). As yet another example, the UE 120 may determine that the measurement frequency is for ENDC if the NR MO indicates the NR MO is configured in association with a location (e.g., a public land mobile network (PLMN), a mobile country code (MCC), a geo-location based location, a tracking area, or a geographical area associated with a cell) where NR SA mode is not deployed. This determination can be based at least in part on pre-configuration, crowdsourcing, or the like. As yet another example, the UE 120 may determine that the measurement frequency is for ENDC if an NR MO is not received via a system information block (e.g., SIB24 inter-routing area neighbor on LTE, SIB4 in NR SA), and the BS 110 has not configured the measurement frequency as an NR SA frequency in the location (e.g., within a time window such as a last X seconds), and has configured the NR measurement frequency as a NR SCG. In some aspects, if an NR MO is exclusively associated with event B2 measurement reporting configuration, the NR MO may typically be used for inter-RAT HO or redirection.

As shown by reference number 425, the PM module may provide, to the anchor module, a notification that the available power for the second RAT fails to satisfy the first threshold. For example, the UE 120 may determine that the power management level fails to satisfy the first threshold. While example 400 and other examples herein are described using notification-based communication, these examples can also be implemented using polling-based communication.

In some aspects, the UE 120 may determine that the available power for the second RAT fails to satisfy the first threshold based at least in part on whether the addition of the second cell is associated with a dual-connectivity communication or an SA mode. For example, the dual-connectivity communication may be associated with a different first threshold and/or a different second threshold than the SA mode. In some aspects, the UE 120 may determine whether a measurement frequency is associated with the dual-connectivity or the SA mode, and may determine whether the power management level fails to satisfy the first threshold based at least in part on whether the measurement frequency is associated with the dual-connectivity mode or the SA mode.

As shown by reference number 430, based at least in part on determining that the available power for the second RAT fails to satisfy the first threshold, the UE 120 (e.g., the anchor module) may delay measurement reporting. For example, the UE 120 may pause measurement reporting of measurements determined based at least in part on the one or more measurement objects. By delaying measurement reporting, the UE 120 may delay a handover or SCG activation of a cell associated with the second RAT and indicated by the measurement reporting. Thus, the UE 120 may reduce power consumption on the second RAT and reduce the likelihood of SCG RLF failure or detach due to a power-limited scenario. In some aspects, the UE 120 may continue to perform measurements on one or more frequencies indicated by one or more measurement objects, and may report the measurements only after the measurement reporting is unpaused or is no longer delayed.

In some aspects, the UE 120 may be configured with multiple measurement frequencies. In this case, the UE 120 may delay measurement reporting with regard to measurement frequencies associated with power management levels that fail to satisfy the first threshold. For example, the UE 120 may not delay measurement reporting with regard to a measurement frequency associated with a power management level that satisfies the first threshold. Thus, the UE 120 may increase throughput relative to indiscriminately suspending measurement reporting.

In some aspects, the UE 120 may delay measurement reporting based at least in part on the UE 120 being in a dual-connectivity mode and being configured for a handover from an initial second RAT to a target second RAT. For example, the UE 120 may delay the measurement reporting based at least in part on the UE 120 being in an LTE+FR1 ENDC mode, and being configured with NR FR1 and FR2 measurement objects (e.g., to support an NR handover such as from FR1 to FR2 in ENDC, or vice versa), or vice versa. For example, for an LTE to NR handover, the UE 120 may delay event B1/B2 measurement reporting. In an ENDC mode, an NRDC mode, or the like, the UE 120 may also delay NR A3/A4/A5 measurement reporting. The content of these measurement reports, and the corresponding measurement objects, is defined in 3GPP specifications.

As shown by reference number 435, the PM module may provide a notification, to the anchor module, indicating that the high exposure margin threshold is satisfied. The high exposure margin threshold may be a second threshold, which can be the same as the first threshold or different than the first threshold. In some aspects, the high exposure margin threshold may be a threshold for an available power for a communication using the second RAT. If an available power for the second RAT satisfies the first threshold, for example due to the available power for the second RAT being sufficient for a communication on the second RAT, then the UE may determine that transmission of a measurement report on the first RAT is to be resumed (e.g., performed without delay). For example, the UE 120 may identify a power management level for a communication using the second RAT, where the power management level indicates an available power (e.g., a residual available power) for the communication using the second RAT. If the power management level or the available power satisfies the second threshold, then the UE 120 may transmit the measurement report. Thus, the UE 120 may trigger the establishment of the dual-connectivity communication or the handover based at least in part on residual available power for the communication using the second RAT being sufficient for the communication using the second RAT.

As shown by reference number 440, the anchor module may resume measurement reporting associated with the second RAT (e.g., NR measurement reporting) on the first RAT (e.g., the PCell) based at least in part on the notification regarding the high exposure margin threshold. Therefore, as shown by reference number 445, the anchor module (e.g., the UE 120) may transmit the measurement report using the first RAT. For example, the UE 120 may transmit the measurement report on an LTE cell, such as a PCell. The transmission of the measurement report may trigger a dual-connectivity communication or a handover of the UE 120, as described in more detail below.

As shown by reference number 450, the BS 110 may transmit, to the UE 120, a configuration message. For example, the configuration message may indicate a configuration (e.g., a reconfiguration) to add a cell, associated with the second RAT, as a PSCell for a dual-connectivity communication. The configuration message may be based at least in part on the measurement reporting performed at reference number 445. As shown by reference number 455, the anchor module and the NR module may perform a PSCell attach procedure with regard to the PSCell associated with the second RAT based at least in part on the configuration message. Thus, the UE 120 may delay the addition of the cell associated with the second RAT until power conditions at the UE 120 are not so limited as to hamper operation on the second RAT.

As indicated above, FIG. 4 is provided as an example. Other examples may differ from what is described with regard to FIG. 4.

Figure 5:
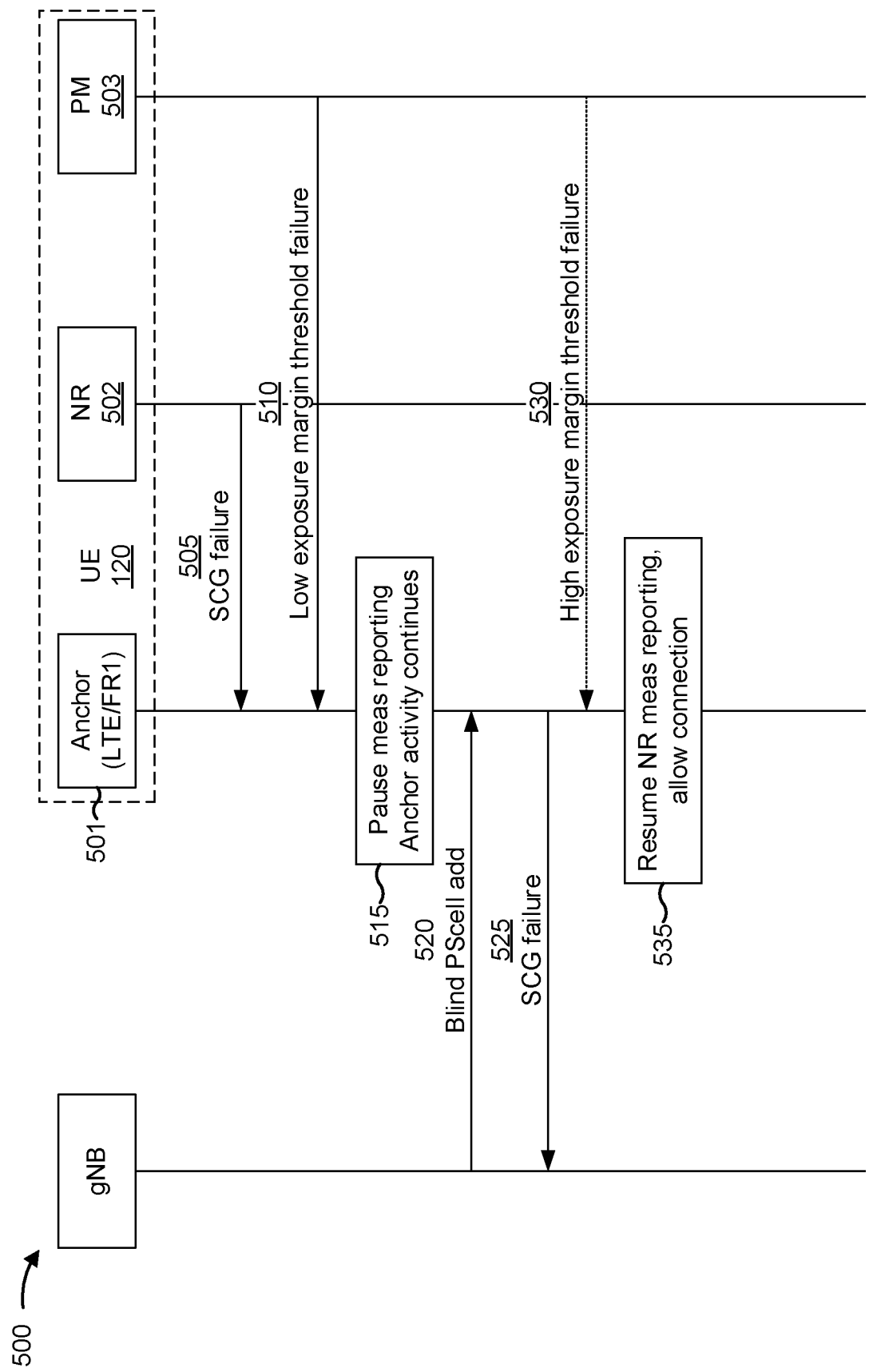
FIG. 5 is a diagram illustrating an example of rejecting a blind primary secondary cell (PSCell) addition based at least in part on a low exposure margin threshold, in accordance with the present disclosure.

FIG. 5 is a diagram illustrating an example 500 of rejecting a blind PSCell addition based at least in part on a low exposure margin threshold, in accordance with the present disclosure. As shown, example 500 includes a BS 110 and a UE 120. As further shown, the UE 120 is associated with an anchor module, an NR module, and a PM module, which are each described in more detail in connection with FIG. 4.

As shown by reference number 505, the UE 120 may optionally experience SCG failure of a cell associated with a second RAT (e.g., NR). This may be due to a power management level associated with the cell associated with the second RAT (e.g., an available power for a communication using the second RAT) being insufficient for communication via the cell associated with the second RAT. As shown by reference number 510, the PM module may provide, to the anchor module, a notification that a low exposure margin threshold is not satisfied. For example, the notification may indicate that available power for the communication on the second RAT fails to satisfy a first threshold, as described in more detail in connection with FIG. 4, above.

As shown by reference number 515, the anchor module may pause (e.g., delay transmission of) measurement reporting on the first RAT. As further shown, the anchor module may continue activity on the first RAT (e.g., the LTE RAT). As shown by reference number 520, the UE 120 (e.g., the anchor module) may receive, from the BS 110, a blind PSCell addition message. A blind PSCell addition message may be transmitted by a BS 110, and may trigger the UE 120 to add a cell (e.g., a PSCell) to an SCG. A blind PSCell addition message may differ from the configuration message shown in FIG. 4 because the blind PSCell addition message may not be triggered by measurement reporting, whereas the configuration message shown in FIG. 4 may be triggered by measurement reporting. In some aspects, the blind PSCell addition message may be referred to as a blind secondary cell group addition.

As shown by reference number 525, the UE 120 (e.g., the anchor module) may transmit an SCG failure message to the BS 110 based at least in part on the blind PSCell addition message. For example, the UE 120 may transmit the SCG failure message based at least in part on the determination that the power management level fails to satisfy the low exposure margin threshold. As another example, the UE 120 may transmit the SCG failure message based at least in part on the UE 120 having paused or delayed measurement reporting based at least in part on the notification shown by reference number 510. In some aspects, the SCG failure message may indicate a fail reason. A fail reason may identify a cause or reason associated with failure to add a cell to the SCG. In some aspects, the fail reason may indicate whether the UE supports a RAT associated with the cell. Thus, the UE 120 may prevent the BS 110 from blindly adding a cell on the second RAT to an SCG of the UE 120 when the UE 120 is in a power-constrained scenario, such as when the power management level fails to satisfy the low exposure margin threshold. For example, the UE 120 may transmit a message rejecting a blind secondary cell group addition associated with a cell.

As shown by reference number 530, the PM module may provide a notification, to the anchor module, that the high exposure margin threshold is satisfied (e.g., that the second threshold is satisfied), as described in more detail in connection with FIG. 4. Accordingly, as shown by reference number 535, the anchor module may resume measurement reporting associated with the second RAT, and may allow the BS 110 to perform blind PSCell addition with regard to the second RAT. In other words, if the UE 120 receives a blind PSCell addition message while the power management level satisfies the high exposure margin threshold, then the UE 120 may perform the blind PSCell addition in accordance with the blind PSCell addition message.

As indicated above, FIG. 5 is provided as an example. Other examples may differ from what is described with regard to FIG. 5.

Figure 6:
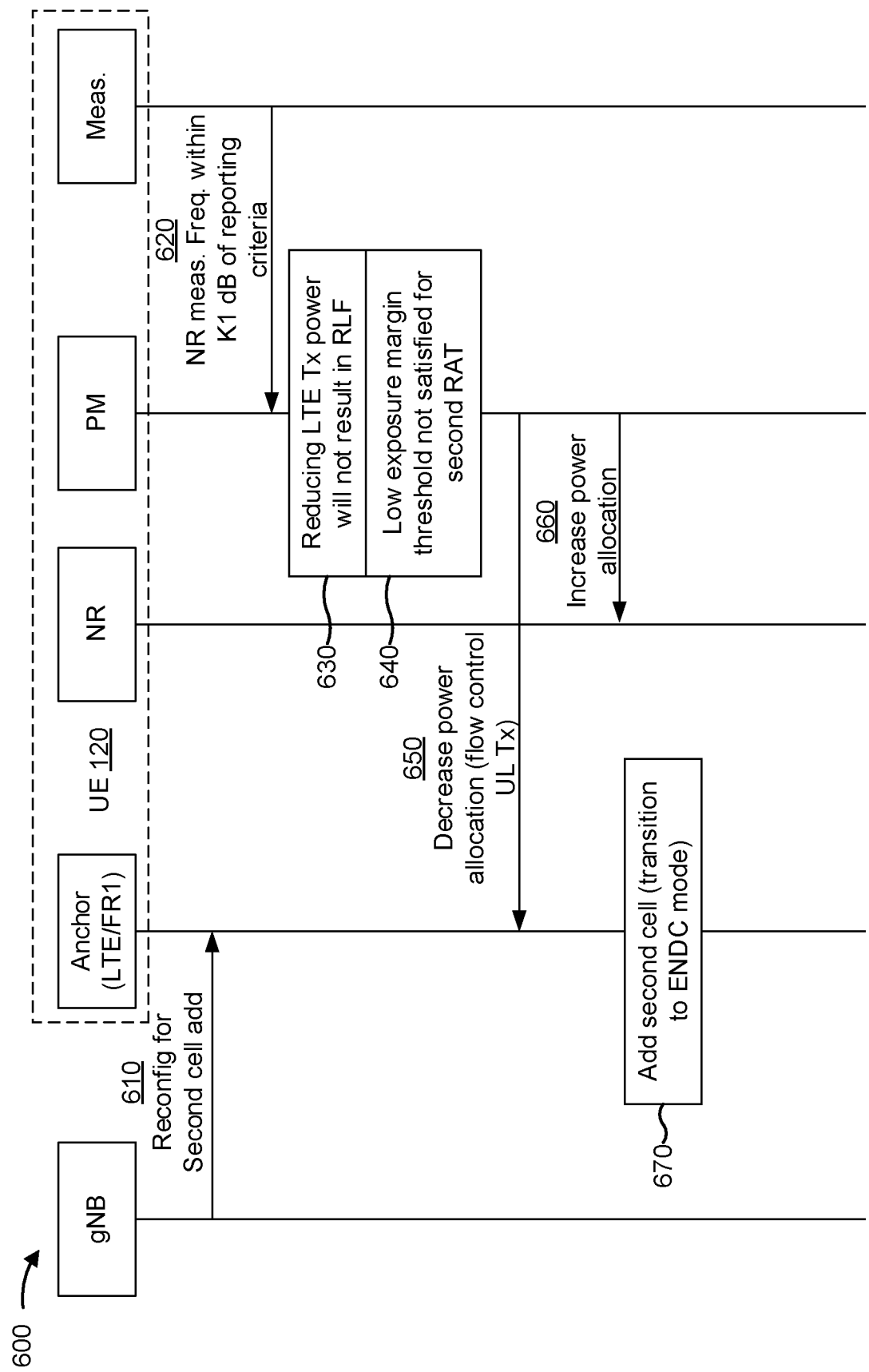
FIG. 6 is a diagram illustrating an example of reallocation of transmit power for a prospective cell addition, in accordance with the present disclosure.

FIG. 6 is a diagram illustrating an example 600 of reallocation of transmit power for a prospective cell addition, in accordance with the present disclosure. As shown, example 500 includes a BS 110 and a UE 120. As further shown, the UE 120 is associated with an anchor module, an NR module, and a PM module, which are each described in more detail in connection with FIGS. 4 and 5. Furthermore, the UE 120 is associated with a measurement (Meas.) module. The measurement module may determine measurements based at least in part on one or more measurement objects received from the BS 110 (not shown in FIG. 6). For example, the measurement module may be capable of performing measurements on a first RAT (e.g., associated with the anchor module) and on a second RAT (e.g., associated with the NR module).

As shown in FIG. 6, and by reference number 610, the UE 120 (e.g., the anchor module) may receive, from a BS 110 and from a first cell associated with the first RAT, a connection reconfiguration message. More generally, the UE 120 may receive a configuration message. The connection reconfiguration message may indicate a second cell, associated with a second RAT, for dual-connectivity communication or a handover or redirection from the first cell to the second cell. For example, the connection reconfiguration message may indicate that the UE 120 is to add the second cell as a cell of an SCG, such as a PSCell. As another example, the connection reconfiguration message may indicate that the UE 120 is to perform a handover (e.g., be handed over) or redirection from the first cell to the second cell. In some aspects, the connection reconfiguration message may be based at least in part on measurement information, such as measurement information determined by the measurement module and/or reported by the UE 120. In some aspects, the connection reconfiguration message may be a blind connection reconfiguration message, such as associated with a blind SCG addition. Thus, the connection reconfiguration message may identify a prospective cell associated with the second RAT.

In some aspects, the UE 120 may perform the operations described with regard to FIG. 6 while the UE 120 has a single active RAT. For example, the UE 120 may reduce a compliance power budget on the single active RAT (e.g., the first RAT) to facilitate addition of a second cell. In some aspects, the second cell is associated with the single active RAT. In some aspects, the second cell is associated with a different RAT. In the case of the single active RAT, in some aspects, the UE 120 may not receive a configuration message. For example, the UE may identify, while connected to a first cell associated with a first RAT, a second cell, associated with a second RAT, for dual-connectivity communication or handover.

As shown by reference number 620, the measurement module may provide, to the PM module, an indication that a measurement on the second cell (e.g., associated with a measurement frequency of the second cell) is within a threshold of a reporting criterion. For example, the indication may indicate that the measurement on the second cell is within K1 dB of the reporting criterion, wherein K1 is a number. As another example, the indication may indicate that the measurement on the second cell satisfies the reporting criterion (indicating that handover or addition of the second cell is imminent).

As shown by reference number 630, the PM module (or another module of the UE 120, such as the measurement module) may determine that reducing an LTE transmit power (e.g., reducing a power management level of the first RAT) will not result in RLF on the first RAT. For example, the PM module may determine that the first RAT is associated with sufficient power to maintain a link with the BS 110 even if the power allocated to the first RAT is reduced.

As shown by reference number 640, the PM module (or another module of the UE 120, such as the measurement module) may determine that a low exposure margin threshold is not satisfied for the second RAT. For example, the PM module may identify a power management level of the second RAT, and may determine that the power management level is associated with a power allocation that fails to satisfy the low exposure margin threshold. Thus, the PM module may determine that, if a current power allocation of the UE 120 is used for the second cell, RLF is likely to occur with regard to RACH, a PUCCH/PUSCH transmission, or the like, on the second cell. This determination is described in more detail in connection with FIG. 4.

In some aspects, the PM module may determine that the cell(s) associated with the second RAT will not have adequate power to complete a successful RACH procedure. In some aspects, the PM module may determine that the cell(s) associated with the second RAT do not have adequate power for PUCCH/PUSCH link maintenance. In some aspects, the PM module may determine that the cell(s) associated with the second RAT do not have adequate power to satisfy a minimum target uplink data rate. In some aspects, the PM module may determine that adding the cell(s) associated with the second RAT for a dual-connectivity communication will result in higher uplink throughput and/or improved energy efficiency compared to the first RAT's leg of the dual-connectivity communication.

As shown by reference number 650, the PM module may cause the anchor module to decrease a power allocation on the first RAT based at least in part on one or more of the conditions described with regard to reference numbers 620, 630, and 640 being satisfied. For example, the PM module may reconfigure an antenna module associated with the anchor module to decrease a transmit power allocated for the first RAT. As another example, the PM module may cause the UE 120 to flow control uplink transmissions (e.g., to throttle uplink transmissions, to decrease a data rate of uplink transmissions, to decrease a transmit power of uplink transmissions, or the like), which may reduce power consumption associated with the first RAT. As shown by reference number 660, the PM module may increase a power allocation for the second RAT based at least in part on one or more of the conditions described with regard to reference numbers 620, 630, and 640 being satisfied. In some aspects, the PM module may increase the power allocation for the second RAT based at least in part on the power allocation for the first RAT being decreased. For example, the power allocation for the second RAT may be a residual power allocation after power is allocated for the first RAT (and may thus be increased as the power allocated for the first RAT is decreased). As shown by reference number 670, the UE 120 may add the second cell (e.g., may transition to ENDC mode). In some aspects, the UE may perform a handover from the first cell to the second cell. Thus, the UE 120 may improve throughput on the second RAT and reduce the likelihood of RLF or link release on the second RAT.

As indicated above, FIG. 6 is provided as an example. Other examples may differ from what is described with regard to FIG. 6.

Figure 7:
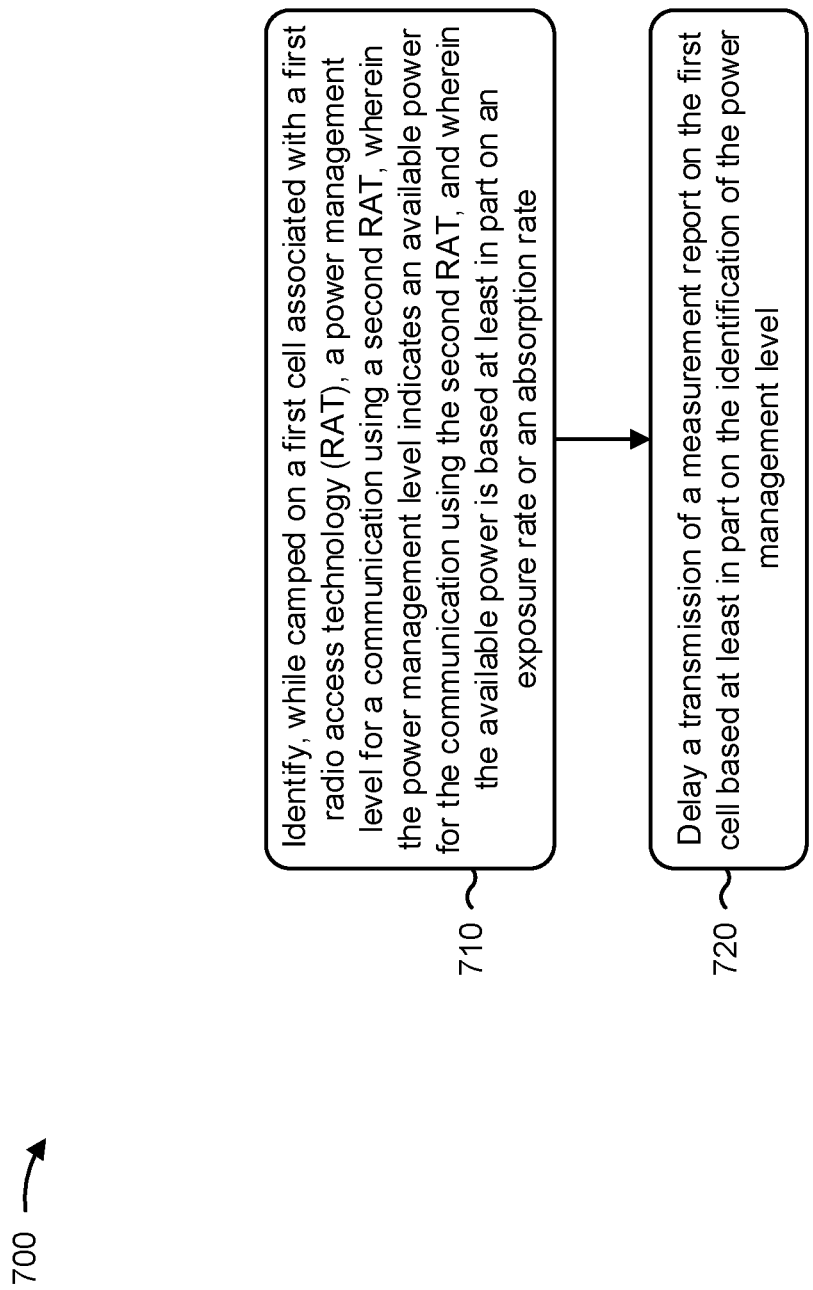
FIGS. 7-8 are diagrams illustrating example processes in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for measurement reporting and transmit power allocation in a power-constrained environment.

As shown in FIG. 7, in some aspects, process 700 may include identifying, while camped on a first cell associated with a first RAT, a power management level for a communication using a second RAT, wherein the power management level indicates an available power for the communication using the second RAT, and wherein the available power is based at least in part on an exposure rate or an absorption rate (block 710). For example, the UE (e.g., using PM component 908, depicted in FIG. 9) may identify, while camped on a first cell associated with a first RAT, a power management level for a communication using a second RAT, wherein the power management level indicates an available power for the communication using the second RAT, and wherein the available power is based at least in part on an exposure rate or an absorption rate, as described above.

As further shown in FIG. 7, in some aspects, process 700 may include delaying a transmission of a measurement report on the first cell based at least in part on the identification of the power management level (block 720). For example, the UE (e.g., using anchor component 910, depicted in FIG. 9) may delay a transmission of a measurement report on the first cell based at least in part on the identification of the power management level, as described above.

Process 700 may include additional aspects, such as any single aspect or any combination of aspects described below and/or in connection with one or more other processes described elsewhere herein.

In a first aspect, the power management level fails to satisfy a threshold, and the transmission is delayed based at least in part on the power management level failing to satisfy the threshold.

In a second aspect, alone or in combination with the first aspect, the threshold is associated with a communication type of the communication using the second RAT.

In a third aspect, alone or in combination with one or more of the first and second aspects, the threshold is associated with maintaining a minimum target data rate associated with the second RAT.

In a fourth aspect, alone or in combination with one or more of the first through third aspects, the communication using the second RAT is a random access channel (RACH) communication.

In a fifth aspect, alone or in combination with one or more of the first through fourth aspects, the communication using the second RAT is associated with an uplink shared channel or an uplink control channel.

In a sixth aspect, alone or in combination with one or more of the first through fifth aspects, the available power is a residual available power after power has been allocated for a communication using the first RAT.

In a seventh aspect, alone or in combination with one or more of the first through sixth aspects, process 700 includes determining that a threshold associated with the power management level is satisfied, and resuming transmission of the measurement report based at least in part on the threshold being satisfied.

In an eighth aspect, alone or in combination with one or more of the first through seventh aspects, process 700 includes determining that the measurement report is associated with a particular frequency, wherein the power management level is based at least in part on the measurement report being associated with the particular frequency.

In a ninth aspect, alone or in combination with one or more of the first through eighth aspects, the identification of the power management level is based at least in part on whether the particular frequency associated with the measurement report is associated with a dual-connectivity cell addition or a handover or redirection to a standalone cell.

In a tenth aspect, alone or in combination with one or more of the first through ninth aspects, process 700 includes determining whether the particular frequency is associated with the dual-connectivity cell addition or the handover or redirection to the standalone cell based at least in part on the particular frequency being in a frequency range that the UE does not support for a primary cell.

In an eleventh aspect, alone or in combination with one or more of the first through tenth aspects, the frequency range is a millimeter wave frequency range.

In a twelfth aspect, alone or in combination with one or more of the first through eleventh aspects, process 700 includes determining whether the particular frequency is associated with the dual-connectivity cell addition or the handover or redirection to the standalone cell based at least in part on whether the measurement report is associated with a location where a standalone mode associated with the second RAT is not deployed.

In a thirteenth aspect, alone or in combination with one or more of the first through twelfth aspects, process 700 includes determining whether the particular frequency is associated with the dual-connectivity cell addition or the handover or redirection to the standalone cell based at least in part on whether the UE has received information indicating that the particular frequency can be used for a standalone cell or a secondary cell group.

In a fourteenth aspect, alone or in combination with one or more of the first through thirteenth aspects, the transmission of the measurement report is delayed with regard to a frequency for which the power management level is identified.

In a fifteenth aspect, alone or in combination with one or more of the first through fourteenth aspects, measurement reporting is not delayed with regard to a frequency for which the power management level is not identified.

In a sixteenth aspect, alone or in combination with one or more of the first through fifteenth aspects, process 700 includes rejecting a blind secondary cell group addition associated with a cell based at least in part on the power management level being identified for the cell.

In a seventeenth aspect, alone or in combination with one or more of the first through sixteenth aspects, the power management level is associated with a handover of the UE to the second RAT, and the measurement report is associated with a measurement configured on a frequency associated with the second RAT.

In an eighteenth aspect, alone or in combination with one or more of the first through seventeenth aspects, the power management level is based at least in part on historical information associated with a cell.

In a nineteenth aspect, alone or in combination with one or more of the first through eighteenth aspects, the power management level is based at least in part on motion information determined by the UE.

In a twentieth aspect, alone or in combination with one or more of the first through nineteenth aspects, the first RAT is a Long Term Evolution RAT.

In a twenty-first aspect, alone or in combination with one or more of the first through twentieth aspects, the first RAT is a New Radio RAT in a Frequency Range 1.

In a twenty-second aspect, alone or in combination with one or more of the first through twenty-first aspects, the first RAT is a New Radio RAT in a Frequency Range 2.

In a twenty-third aspect, alone or in combination with one or more of the first through twenty-second aspects, the second RAT is a Long Term Evolution RAT.

In a twenty-fourth aspect, alone or in combination with one or more of the first through twenty-third aspects, the second RAT is a New Radio RAT in a Frequency Range 1.

In a twenty-fifth aspect, alone or in combination with one or more of the first through twenty-fourth aspects, the second RAT is a New Radio RAT in a Frequency Range 2.

In a twenty-sixth aspect, alone or in combination with one or more of the first through twenty-fifth aspects, process 700 includes transmitting information indicating whether the UE supports the second RAT.

In a twenty-seventh aspect, alone or in combination with one or more of the first through twenty-sixth aspects, the information indicating whether the UE supports the second RAT is transmitted as a fail reason in a message rejecting a blind secondary cell group addition associated with a cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
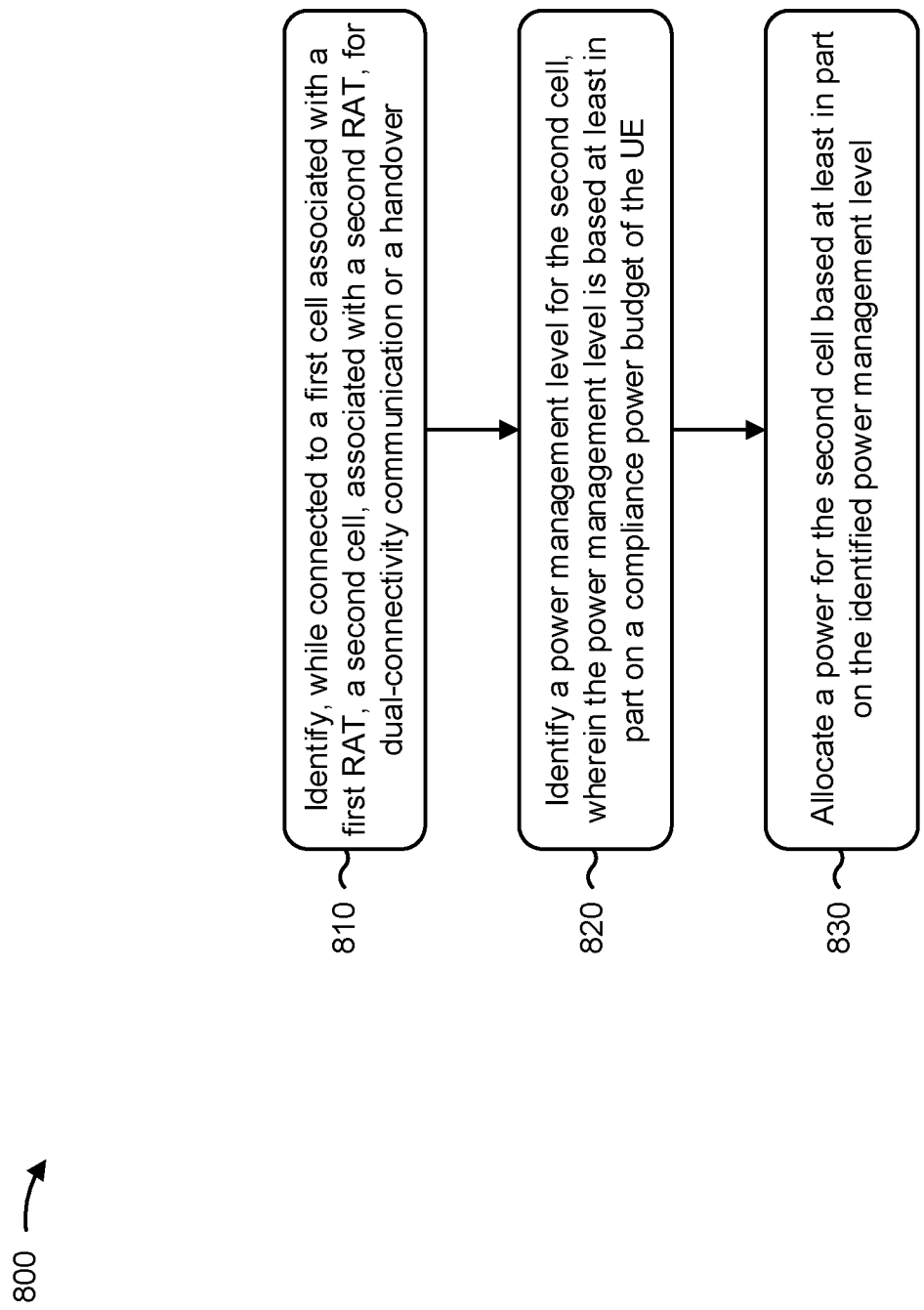

FIG. 8 is a diagram illustrating an example process 800 performed, for example, by a UE, in accordance with the present disclosure. Example process 800 is an example where the UE (e.g., UE 120) performs operations associated with techniques for measurement reporting and transmit power allocation in power-constrained environment.

As shown in FIG. 8, in some aspects, process 800 may include identifying, while connected to a first cell associated with a first RAT, a second cell, associated with a second RAT, for dual-connectivity communication or a handover (block 810). For example, the UE (e.g., using anchor component 1010, depicted in FIG. 10) may identify, while connected to a first cell associated with a first RAT, a second cell, associated with a second RAT, for dual-connectivity communication or a handover, as described above.

As further shown in FIG. 8, in some aspects, process 800 may include identifying a power management level for the second cell, wherein the power management level is based at least in part on a compliance power budget of the UE (block 820). For example, the UE (e.g., using PM component 1008, depicted in FIG. 10) may identify a power management level for the second cell, wherein the power management level is based at least in part on a compliance power budget of the UE, as described above.

As further shown in FIG. 8, in some aspects, process 800 may include allocating a power for the second cell based at least in part on the identified power management level (block 830). For example, the UE (e.g., using PM component 1008, depicted in FIG. 10) may allocate a power for the second cell based at least in part on the identified power management level, as described above.

Process 800 may include additional aspects, such as any single aspect or any combination of aspects described below and/or in connection with one or more other processes described elsewhere herein.

In a first aspect, the power management level is based at least in part on a determination that decreasing power allocated for the first RAT will not cause radio link failure on the first cell.

In a second aspect, alone or in combination with the first aspect, the power management level is based at least in part on a determination that a measurement on the second cell is within a threshold of a measurement reporting criterion, or that the measurement on the second cell satisfies the measurement reporting criterion and a time to trigger the handover or a cell addition has started.

In a third aspect, alone or in combination with one or more of the first and second aspects, the power management level is based at least in part on a determination, before the compliance power budget is modified, that the second cell would not have adequate power to complete a communication.

In a fourth aspect, alone or in combination with one or more of the first through third aspects, the power management level is based at least in part on a determination regarding a throughput or energy efficiency if the second cell is added.

In a fifth aspect, alone or in combination with one or more of the first through fourth aspects, allocating the power for the second cell further comprises configuring an antenna module associated with the first RAT to decrease power allocated for the first RAT.

In a sixth aspect, alone or in combination with one or more of the first through fifth aspects, process 800 includes throttling an uplink transmission on the first RAT based at least in part on the identification of the power management level.

In a seventh aspect, alone or in combination with one or more of the first through sixth aspects, the second cell is to be added as a primary secondary cell of the dual-connectivity communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
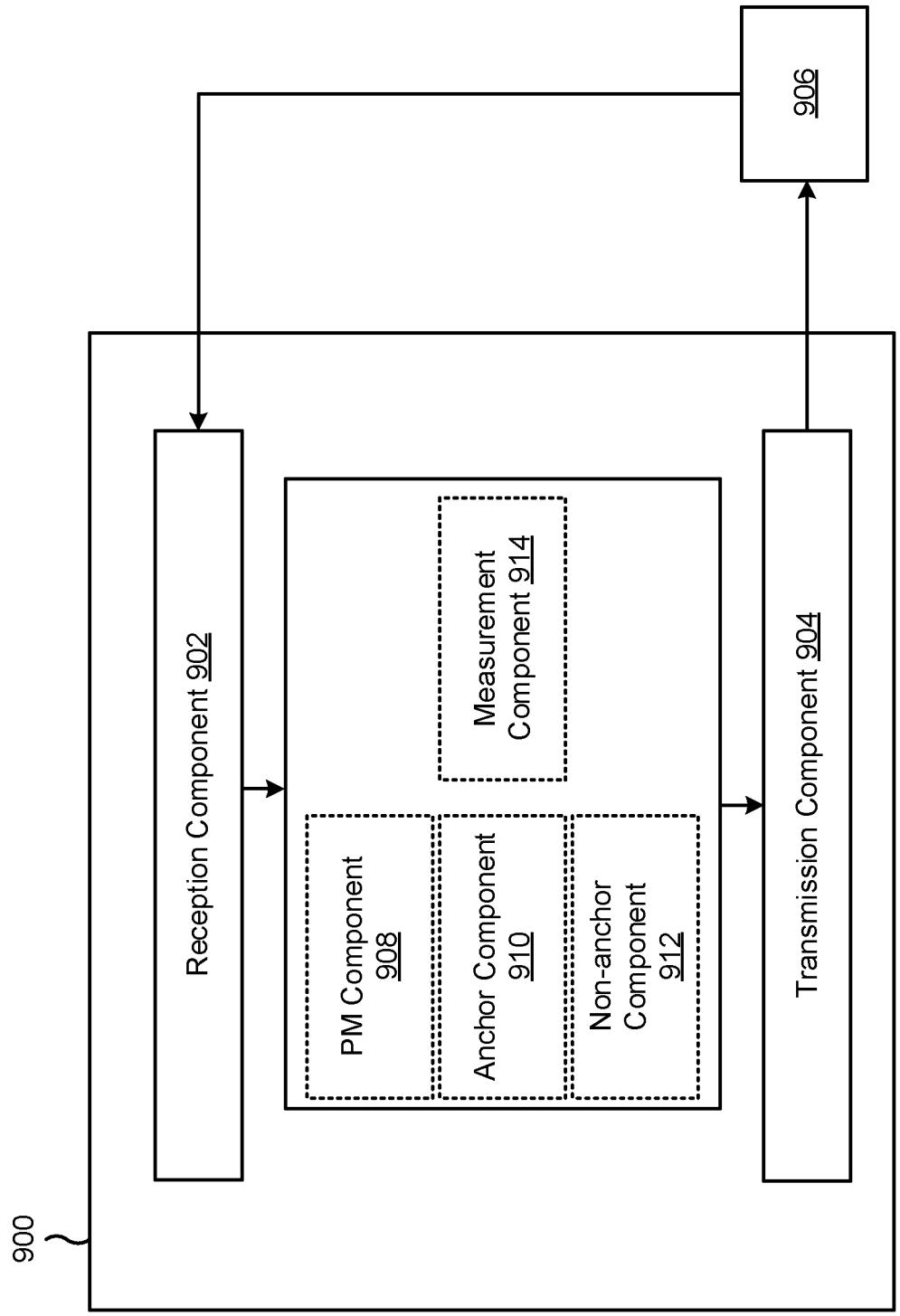
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a PM component 908, an anchor component 910, a non-anchor component 912, and a measurement component 914, among other examples.

The PM component 908 may include or be the PM module of FIGS. 4-6, and may include controller/processor 280, transmit processor 264, TX MIMO processor 266, MOD 254, antenna 252, DEMOD 254, MIMO detector 256, receive processor 258, and/or the like. The anchor component 910 may include or be the anchor module of FIGS. 4-6, and may include controller/processor 280, transmit processor 264, TX MIMO processor 266, MOD 254, antenna 252, DEMOD 254, MIMO detector 256, receive processor 258, and/or the like. The non-anchor component 912 may include or be the NR module of FIGS. 4-6, and may include controller/processor 280, transmit processor 264, TX MIMO processor 266, MOD 254, antenna 252, DEMOD 254, MIMO detector 256, receive processor 258, and/or the like. The measurement component 914 may include or be the measurement module of FIG. 6, and may include controller/processor 280, transmit processor 264, TX MIMO processor 266, MOD 254, antenna 252, DEMOD 254, MIMO detector 256, receive processor 258, and/or the like.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digitalto-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The PM component 908 may identify, while camped on a first cell associated with a first RAT, a power management level for a communication using a second RAT, wherein the power management level indicates an available power for the communication using the second RAT, and wherein the available power is based at least in part on an exposure rate or an absorption rate. The PM component 908 or the anchor component 910 may delay a transmission of a measurement report on the first cell based at least in part on the identification of the power management level.

The PM component 908 may determine that a threshold associated with the power management level is satisfied.

The anchor component 910 or the PM component 908 may resume transmission of the measurement report based at least in part on the threshold being satisfied.

The PM component 908 or the measurement component 914 may determine that the measurement report is associated with a particular frequency, wherein the power management level is based at least in part on the measurement report being associated with the particular frequency.

The PM component 908 or the measurement component 914 may determine whether the particular frequency is associated with the dual-connectivity cell addition or the handover or redirection to the standalone cell based at least in part on the particular frequency being a millimeter wave frequency and the UE not supporting a millimeter wave primary cell.

The PM component 908 or the measurement component 914 may determine whether the particular frequency is associated with the dual-connectivity cell addition or the handover or redirection to the standalone cell based at least in part on the particular frequency being in a frequency range that the UE does not support for a primary cell.

The PM component 908 or the measurement component 914 may determine whether the particular frequency is associated with the dual-connectivity cell addition or the handover or redirection to the standalone cell based at least in part on whether the measurement report is associated with a location where a standalone mode associated with the second RAT is not deployed.

The PM component 908 or the measurement component 914 may determine whether the particular frequency is associated with the dual-connectivity cell addition or the handover or redirection to the standalone cell based at least in part on whether the UE has received information indicating that the particular frequency can be used for a standalone cell or a secondary cell group.

The anchor component 910 or the PM component 908 may reject a blind secondary cell group addition associated with a cell based at least in part on the power management level being identified for the cell.

The transmission component 904 may transmit information indicating whether the UE supports the second RAT.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
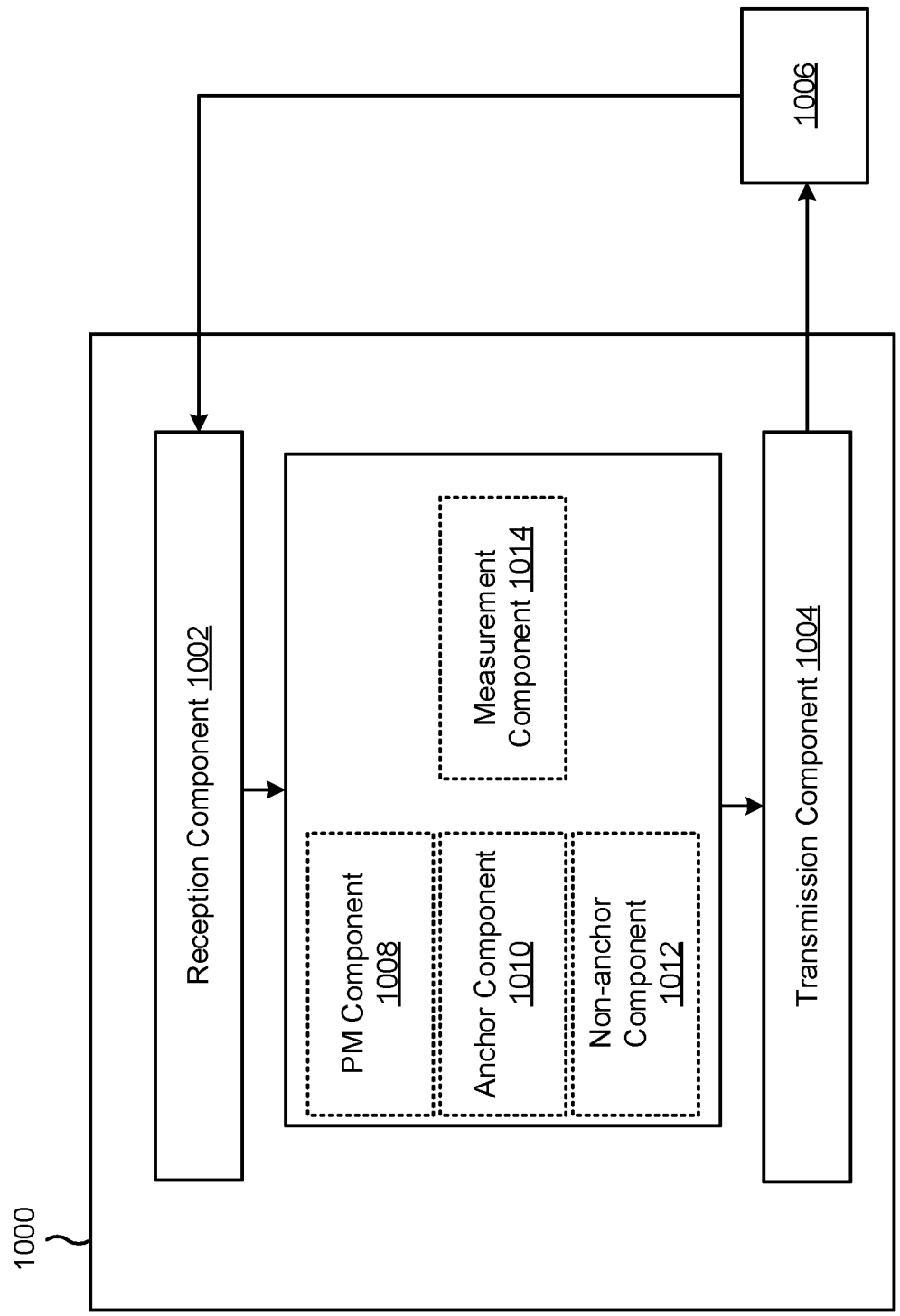

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a PM component 1008, an anchor component 1010, a non-anchor component 1012, and a measurement component 1014, among other examples.

The PM component 1008 may include or be the PM module of FIGS. 4-6, and may include controller/processor 280, transmit processor 264, TX MIMO processor 266, MOD 254, antenna 252, DEMOD 254, MIMO detector 256, receive processor 258, and/or the like. The anchor component 1010 may include or be the anchor module of FIGS. 4-6, and may include controller/processor 280, transmit processor 264, TX MIMO processor 266, MOD 254, antenna 252, DEMOD 254, MIMO detector 256, receive processor 258, and/or the like. The non-anchor component 1012 may include or be the NR module of FIGS. 4-6, and may include controller/processor 280, transmit processor 264, TX MIMO processor 266, MOD 254, antenna 252, DEMOD 254, MIMO detector 256, receive processor 258, and/or the like. The measurement component 1014 may include or be the measurement module of FIG. 6, and may include controller/processor 280, transmit processor 264, TX MIMO processor 266, MOD 254, antenna 252, DEMOD 254, MIMO detector 256, receive processor 258, and/or the like.

In some aspects, the apparatus 1000 may be configured to perform one or more operations described herein in connection with FIGS. 3-6. Additionally or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 or the PM component 1008 may identify, while connected to a first cell associated with a first RAT, a second cell, associated with a second RAT, for dual-connectivity communication or a handover. The PM component 1008 or the measurement component 1014 may identify a power management level for the second cell, wherein the power management level is based at least in part on a compliance power budget of the UE. The PM component 1008 or the measurement component 1014 may allocate a power for the second cell based at least in part on the identified power management level.

The PM component 1008 or the anchor component 1010 may throttle an uplink transmission on the first RAT based at least in part on the identification of the power management level.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

While the techniques and apparatuses described herein are often described in the context of LTE to ENDC transitions, such as where the first RAT is an LTE or FR1 RAT and the second RAT is an NR RAT, the techniques and apparatuses described herein are generalizable to any case where multiple links have configured uplinks. Some examples include ENDC or next generation ENDC (NG-ENDC) (e.g., LTE+FR1, LTE+FR2, LTE+FR1 to LTE+FR2 HO), NR-DC (e.g., FR1+FR1, FR1+FR2, HO between these topologies), NEDC topologies and similar HO between various sub-configurations in NE DC, an NR SA mode (e.g., an LTE to FR1 HO, an LTE to FR2 HO, an FR1 to FR2 HO), an FR1 with no UL carrier aggregation (CA) to FR1 with UL CA or FR1+FR2 UL CA, or an FR2 to FR2 UL CA+FR1 UL CA mode, a dual connectivity mode wherein the uplink connection is time division multiplexed between LTE and NR in ENDC, or the like.

The following provides an overview of some Aspects of the present disclosure:

Aspect 1: A method of wireless communication performed by a user equipment (UE), comprising: identifying, while camped on a first cell associated with a first radio access technology (RAT), a power management level for a communication using a second RAT, wherein the power management level indicates an available power for the communication using the second RAT, and wherein the available power is based at least in part on an exposure rate or an absorption rate; and delaying a transmission of a measurement report on the first cell based at least in part on the identification of the power management level.

Aspect 2: The method of Aspect 1, wherein the power management level fails to satisfy a threshold, and wherein the transmission is delayed based at least in part on the power management level failing to satisfy the threshold.

Aspect 3: The method of Aspect 2, wherein the threshold is associated with a communication type of the communication using the second RAT.

Aspect 4: The method of Aspect 2, wherein the threshold is associated with maintaining a minimum target data rate associated with the second RAT.

Aspect 5: The method of Aspect 2, wherein the communication using the second RAT is a random access channel (RACH) communication.

Aspect 6: The method of Aspect 2, wherein the communication using the second RAT is associated with an uplink shared channel or an uplink control channel.

Aspect 7: The method of any of Aspects 1-6, wherein the available power is a residual available power after power has been allocated for a communication using the first RAT.

Aspect 8: The method of any of Aspects 1-7, further comprising: determining that a threshold associated with the power management level is satisfied; and resuming transmission of the measurement report based at least in part on the threshold being satisfied.

Aspect 9: The method of any of Aspects 1-8, further comprising: determining that the measurement report is associated with a particular frequency, wherein the power management level is based at least in part on the measurement report being associated with the particular frequency.

Aspect 10: The method of Aspect 9, wherein the identification of the power management level is based at least in part on whether the particular frequency associated with the measurement report is associated with a dual-connectivity cell addition or a handover or redirection to a standalone cell.

Aspect 11: The method of Aspect 10, further comprising: determining whether the particular frequency is associated with the dual-connectivity cell addition or the handover or redirection to the standalone cell based at least in part on the particular frequency being a millimeter wave frequency and the UE not supporting a millimeter wave primary cell.

Aspect 12: The method of Aspect 10, further comprising: determining whether the particular frequency is associated with the dual-connectivity cell addition or the handover or redirection to the standalone cell based at least in part on the particular frequency being in a frequency range that the UE does not support for a primary cell.

Aspect 13: The method of Aspect 10, further comprising: determining whether the particular frequency is associated with the dual-connectivity cell addition or the handover or redirection to the standalone cell based at least in part on whether the measurement report is associated with a location where a standalone mode associated with the second RAT is not deployed.

Aspect 14: The method of Aspect 10, further comprising: determining whether the particular frequency is associated with the dual-connectivity cell addition or the handover or redirection to the standalone cell based at least in part on whether the UE has received information indicating that the particular frequency can be used for a standalone cell or a secondary cell group.

Aspect 15: The method of any of Aspects 1-14, wherein the transmission of the measurement report is delayed with regard to a frequency for which the power management level is identified.

Aspect 16: The method of Aspect 15, wherein measurement reporting is not delayed with regard to a frequency for which the power management level is not identified.

Aspect 17: The method of any of Aspects 1-16, further comprising: rejecting a blind secondary cell group addition associated with a cell based at least in part on the power management level being identified for the cell.

Aspect 18: The method of any of Aspects 1-17, wherein the power management level is associated with a handover of the UE to the second RAT, and wherein the measurement report is associated with a measurement configured on a frequency associated with the second RAT.

Aspect 19: The method of any of Aspects 1-18, wherein the power management level is based at least in part on historical information associated with a cell.

Aspect 20: The method of any of Aspects 1-19, wherein the power management level is based at least in part on motion information determined by the UE.

Aspect 21: The method of any of Aspects 1-20, wherein the first RAT is a Long Term Evolution RAT.

Aspect 22: The method of any of Aspects 1-21, wherein the first RAT is a New Radio RAT in a Frequency Range 1.

Aspect 23: The method of any of Aspects 1-22, wherein the first RAT is a New Radio RAT in a Frequency Range 2.

Aspect 24: The method of any of Aspects 1-23, wherein the second RAT is a Long Term Evolution RAT.

Aspect 25: The method of any of Aspects 1-24, wherein the second RAT is a New Radio RAT in a Frequency Range 1.

Aspect 26: The method of any of Aspects 1-25, wherein the second RAT is a New Radio RAT in a Frequency Range 2.

Aspect 27: The method of any of Aspects 1-26, further comprising: transmitting information indicating whether the UE supports the second RAT.

Aspect 28: The method of Aspect 27, wherein the information indicating whether the UE supports the second RAT is transmitted as a fail reason in a message rejecting a blind secondary cell group addition associated with a cell.

Aspect 29: A method of wireless communication performed by a user equipment (UE), comprising: identifying, while connected to a first cell associated with a first radio access technology (RAT), a second cell, associated with a second RAT, for dual-connectivity communication or a handover; identifying a power management level for the second cell, wherein the power management level is based at least in part on a compliance power budget of the UE; and allocating, prior to adding the second cell, a power for the second cell based at least in part on the identified power management level.

Aspect 30: The method of Aspect 29, wherein the power management level is based at least in part on a determination that decreasing power allocated for the first RAT will not cause radio link failure on the first cell.

Aspect 31: The method of any of Aspects 29-30, wherein the power management level is based at least in part on a determination that a measurement on the second cell is within a threshold of a measurement reporting criterion, or that the measurement on the second cell satisfies the measurement reporting criterion and a time to trigger the handover or a cell addition has started.

Aspect 32: The method of any of Aspects 29-31, wherein the power management level is based at least in part on a determination, before the compliance power budget is modified, that the second cell would not have adequate power to complete a communication.

Aspect 33: The method of any of Aspects 29-32, wherein the power management level is based at least in part on a determination regarding a throughput or energy efficiency if the second cell is added.

Aspect 34: The method of any of Aspects 29-33, wherein allocation of the power for the second cell further comprises: configuring an antenna module associated with the first RAT to decrease power allocated for the first RAT.

Aspect 35: The method of any of Aspects 29-34, further comprising: throttling an uplink transmission on the first RAT based at least in part on the identification of the power management level.

Aspect 36: The method of any of Aspects 29-35, wherein the second cell is to be added as a primary secondary cell of the dual-connectivity communication.

Aspect 37: The method of any of Aspects 29-36, wherein the power management level is based at least in part a minimum uplink data rate for a service associated with the first RAT.

Aspect 38: An apparatus for wireless communication at a device, comprising a processor; memory coupled with the processor; and instructions stored in the memory and executable by the processor to cause the apparatus to perform the method of one or more of Aspects 1-37.

Aspect 39: A device for wireless communication, comprising a memory and one or more processors coupled to the memory, the one or more processors configured to perform the method of one or more of Aspects 1-37.

Aspect 40: An apparatus for wireless communication, comprising at least one means for performing the method of one or more of Aspects 1-37.

Aspect 41: A non-transitory computer-readable medium storing code for wireless communication, the code comprising instructions executable by a processor to perform the method of one or more of Aspects 1-37.

Aspect 42: A non-transitory computer-readable medium storing a set of instructions for wireless communication, the set of instructions comprising one or more instructions that, when executed by one or more processors of a device, cause the device to perform the method of one or more of Aspects 1-37.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
identify, while camped on a first cell associated with a first radio access technology (RAT), a power management level for a communication using a second RAT, wherein the power management level indicates an available power for the communication using the second RAT, and wherein the available power is based at least in part on an exposure rate or an absorption rate; and
delay a transmission of a measurement report on the first cell based at least in part on the identification of the power management level, wherein:
the power management level is based at least in part on the measurement report being associated with a frequency, and
the frequency is associated with at least one of a dual-connectivity cell addition, a handover to a standalone cell, or a redirection to the standalone cell.

2. The apparatus of claim 1, wherein the power management level fails to satisfy a threshold, and wherein the transmission is delayed based at least in part on the power management level failing to satisfy the threshold.

3. The apparatus of claim 2, wherein the threshold is associated with a communication type of the communication using the second RAT.

4. The apparatus of claim 2, wherein the threshold is associated with maintaining a minimum target data rate associated with the second RAT.

5. The apparatus of claim 1, wherein the communication using the second RAT is a random access channel (RACH) communication.

6. The apparatus of claim 1, wherein the communication using the second RAT is associated with an uplink shared channel or an uplink control channel.

7. The apparatus of claim 1, wherein the available power is a residual available power remaining after power has been allocated from a full compliance power budget for a communication using the first RAT.

8. The apparatus of claim 1, wherein the one or more processors are further configured to:
determine that a threshold associated with the power management level is satisfied; and
resume transmission of the measurement report based at least in part on the threshold being satisfied.

9. The apparatus of claim 1, wherein the one or more processors are further configured to:
determine whether the frequency is associated with the dual-connectivity cell addition, the handover to the standalone cell, or the redirection to the standalone cell based at least in part on the frequency being in a frequency range that the UE does not support for a primary cell.

10. The apparatus of claim 9, wherein the frequency range is a millimeter wave frequency range.

11. The apparatus of claim 1, wherein the one or more processors are further configured to:
determine whether the frequency is associated with the dual-connectivity cell addition, the handover to the standalone cell, or the redirection to the standalone cell based at least in part on whether the measurement report is associated with a location where a standalone mode associated with the second RAT is not deployed.

12. The apparatus of claim 1, wherein the one or more processors are further configured to:
determine whether the frequency is associated with the dual-connectivity cell addition, the handover to the standalone cell, or the redirection to the standalone cell based at least in part on whether the UE has received information indicating that the frequency can be used for a standalone cell or a secondary cell group.

13. The apparatus of claim 1, wherein the transmission of the measurement report is delayed with regard to a frequency for which the power management level is identified.

14. The apparatus of claim 13, wherein measurement reporting is not delayed with regard to a frequency for which the power management level is not identified.

15. The apparatus of claim 1, wherein the one or more processors are further configured to:
reject a blind secondary cell group addition associated with a cell based at least in part on the power management level being identified for the cell.

16. The apparatus of claim 1, wherein the power management level is associated with a handover of the UE to the second RAT, and wherein the measurement report is associated with a measurement configured on a frequency associated with the second RAT.

17. The apparatus of claim 1, wherein the power management level is based at least in part on historical information associated with a cell.

18. The apparatus of claim 1, wherein the power management level is based at least in part on motion information determined by the UE.

19. The apparatus of claim 1, wherein the one or more processors are further configured to:
transmit information indicating whether the UE supports the second RAT.

20. An apparatus for wireless communication at a user equipment (UE), comprising:
one or more memories; and
one or more processors, coupled to the one or more memories, configured to:
identify, while connected to a first cell associated with a first radio access technology (RAT), a second cell, associated with a second RAT, for dual-connectivity communication or a handover;
identify a power management level for the second cell, wherein the power management level is based at least in part on a compliance power budget of the UE, wherein the power management level is based at least in part on a determination that decreasing power allocated for the first RAT will not cause radio link failure on the first cell; and
allocate, prior to adding the second cell, a power for the second cell based at least in part on the identified power management level.

21. The apparatus of claim 20, wherein the power management level is based at least in part on a determination that a measurement on the second cell is within a threshold of a measurement reporting criterion, or that the measurement on the second cell satisfies the measurement reporting criterion and a time to trigger the handover or a cell addition has started.

22. The apparatus of claim 20, wherein the power management level is based at least in part on a determination, before the compliance power budget is modified, that the second cell would not have adequate power to complete a communication.

23. A method of wireless communication performed by a user equipment (UE), comprising:
identifying, while camped on a first cell associated with a first radio access technology (RAT), a power management level for a communication using a second RAT, wherein the power management level indicates an available power for the communication using the second RAT, and wherein the available power is based at least in part on an exposure rate or an absorption rate; and
delaying a transmission of a measurement report on the first cell based at least in part on the identification of the power management level, wherein:
the power management level is based at least in part on the measurement report being associated with a particular frequency, and
the frequency is associated with a dual-connectivity cell addition, a handover to a standalone cell, or a redirection to the standalone cell.

24. The method of claim 23, wherein the power management level fails to satisfy a threshold, and wherein the transmission is delayed based at least in part on the power management level failing to satisfy the threshold.

25. The method of claim 24, wherein the threshold is associated with a communication type of the communication using the second RAT.

26. The method of claim 24, wherein the threshold is associated with maintaining a minimum target data rate associated with the second RAT.

27. The method of claim 23, wherein the communication using the second RAT is a random access channel (RACH) communication.

28. The method of claim 23, wherein the communication using the second RAT is associated with an uplink shared channel or an uplink control channel.

29. The method of claim 23, wherein the available power is a residual available power remaining after power has been allocated from a full compliance power budget for a communication using the first RAT.

30. A method of wireless communication performed by a user equipment (UE), comprising:
identifying, while connected to a first cell associated with a first radio access technology (RAT), a second cell, associated with a second RAT, for dual-connectivity communication or a handover;
identifying a power management level for the second cell, wherein the power management level is based at least in part on a compliance power budget of the UE, wherein the power management level is based at least in part on a determination that decreasing power allocated for the first RAT will not cause radio link failure on the first cell; and
allocating, prior to adding the second cell, a power for the second cell based at least in part on the identified power management level.

* * * * *